(12) United States Patent
Verhaegh et al.

(10) Patent No.: US 8,103,777 B2
(45) Date of Patent: Jan. 24, 2012

(54) DEVICE AND A METHOD FOR SHARING RESOURCES IN A NETWORK OF PEERS

(75) Inventors: Wilhelmus Franciscus Johannes Verhaegh, Eindhoven (NL); Mauro Barbieri, Eindhoven (NL); Serverius Petrus Paulus Pronk, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 247 days.

(21) Appl. No.: 12/279,887

(22) PCT Filed: Feb. 15, 2007

(86) PCT No.: PCT/IB2007/050501
§ 371 (c)(1),
(2), (4) Date: Aug. 19, 2008

(87) PCT Pub. No.: WO2007/096815
PCT Pub. Date: Aug. 30, 2007

(65) Prior Publication Data
US 2009/0210533 A1 Aug. 20, 2009

(30) Foreign Application Priority Data

Feb. 24, 2006 (EP) .................................... 06110389

(51) Int. Cl.
*G06F 15/173* (2006.01)
(52) U.S. Cl. ...................................................... 709/226
(58) Field of Classification Search .................. 709/217, 709/218, 226; 725/118
See application file for complete search history.

(56) References Cited

U.S. PATENT DOCUMENTS

| | | | |
|---|---|---|---|
| 6,108,308 A | 8/2000 | Flavin et al. | |
| 6,496,812 B1 * | 12/2002 | Campaigne et al. | 706/16 |
| 2002/0184638 A1 * | 12/2002 | Agnihotri et al. | 725/89 |
| 2003/0118014 A1 | 6/2003 | Iyer et al. | |
| 2004/0003066 A1 | 1/2004 | Harvey et al. | |

(Continued)

FOREIGN PATENT DOCUMENTS

WO 03025727 A1 3/2003

OTHER PUBLICATIONS

Hector Garcia-Molina: "Elections in a Distributed Computing System", IEEE Transactions on Computers, Los Alamitos, CA, US, vol. C-31, No. 1, Jan. 1982, pp. 48-59.

(Continued)

*Primary Examiner* — Glenton B Burgess
*Assistant Examiner* — Jason Recek

(57) ABSTRACT

A device and a method for sharing resources in a network of peers are disclosed. A user may compile a wish list (420) of programs to be recorded on a recording device (400) that is a peer in the network. A resource list (421) is compiled of resources that the device shares within the network. The wish list and resource list are communicated to a coordinator (440) comprised within the network. The coordinator makes assignments of who records what and communicates an assignment list (422) to each peer. Each peer plans (405) and executes (407) the assigned recordings, which can be retrieved from a peer (410), or sent to the user device. Deletion control is applied to prevent the loss of recordings by deletion on a local peer. The coordinator may be comprised within a peer, as a standalone service within the network or implemented as a distributed algorithm between the peers.

23 Claims, 18 Drawing Sheets

U.S. PATENT DOCUMENTS

| | | | |
|---|---|---|---|
| 2005/0102698 A1 | 5/2005 | Bumgardner et al. | |
| 2005/0120386 A1 | 6/2005 | Stone | |
| 2005/0138663 A1 | 6/2005 | Throckmorton et al. | |
| 2006/0268354 A1* | 11/2006 | Rodgers et al. | 358/425 |
| 2007/0039033 A1* | 2/2007 | Ota | 725/115 |
| 2010/0153986 A1* | 6/2010 | Ellis | 725/28 |

OTHER PUBLICATIONS

Sergios Soursos, et al: "Distributed Scheduling of Recording Tasks with Interconnected Servers", Networking 2004, Networking Technologies, Services and Portocols, Performance of Computer and Communication Networks; Mobile and Wireless Communications, May 9-14, 2004, pp. 1483-1488.

Curt Cramer, et al: "Distributed Job Scheduling in a Peer-to-Peer Video Recording System", Proceedings of the Workshop on Algorithms and Protocols for Efficient Peer-To-Peer Applications (PEPPA) At Informatik 2004, Ulm DE, Sep. 23, 2004, pp. 1-6.

Dejan S. Milojicic, et al: "Peer-to-Peer Computing", HP Laboratories Technical Report, HPL-2002-57 (R.I), Jul. 14, 2003, pp. 1-52.

* cited by examiner

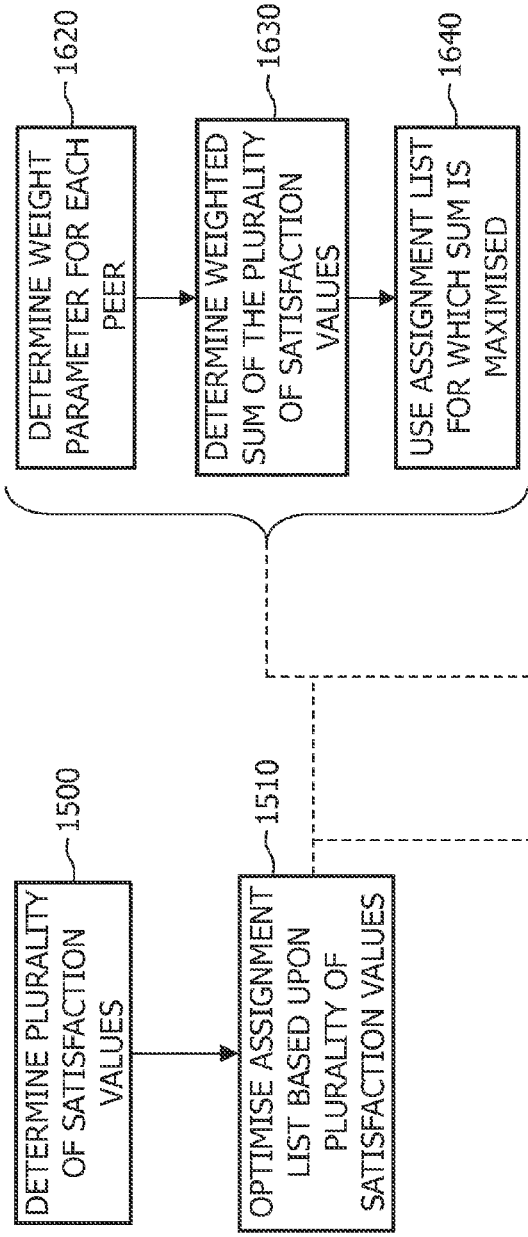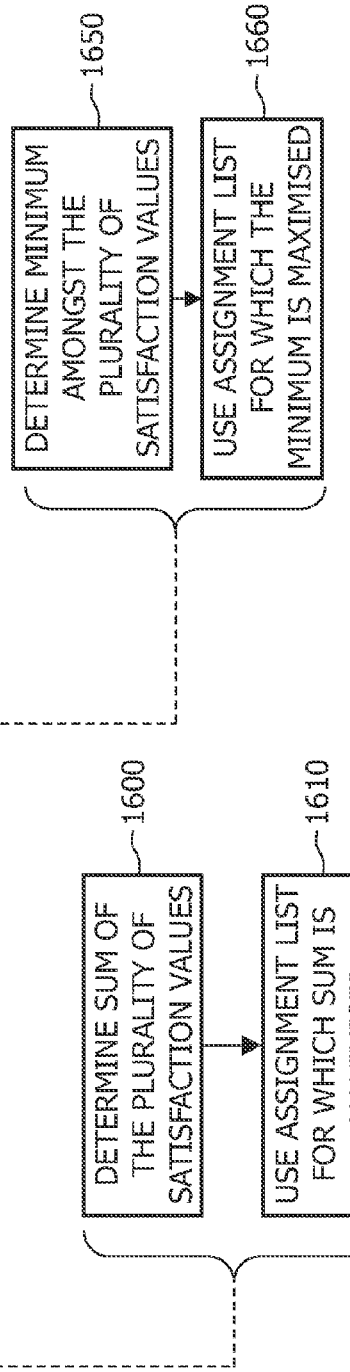

DEVICE AND A METHOD FOR SHARING RESOURCES IN A NETWORK OF PEERS

FIELD OF THE INVENTION

The invention relates to a device for sharing resources in a network of peers.

The invention further relates to a method for sharing resources in a network of peers.

The invention further relates to a program element.

The invention further relates to a computer-readable medium.

BACKGROUND OF THE INVENTION

Recording of broadcasts from television, radio or the Internet is a commonly desired function valued by most consumers. Many Consumer Electronic devices have been developed and sold for such a purpose. Since the introduction of Personal Video Recorders (PVR), such as the products from Tivo and ReplayTV, there has been a significant increase in consumer interest in such products. The associated terminology has also grown rapidly and equivalent devices are also termed Digital Video Recorders (DVR), Hard Disk Recorders (HDR) and Set-Top-Boxes (STB), where the latter is available both with and without storage.

In the common example of a Set-Top-Box, the device is generally capable of receiving analogue or digital broadcast signals and recording such signals on a hard disk drive. However, it is also possible to record programs received by a Set-Top-Box onto a tape or an optical disc, though an external storage device generally performs such recording. Generally, Set-Top-Boxes comprise a tuner and user interface used to select the program that should be recorded via a remote control. To keep the costs to the end consumer low, a typical Set-Top-Box has a limited number of resources. Examples of the limited resources are audio/video encoders, storage capacity, processing capacity and internal or external communication bandwidths. One further example of a limited resource is a tuner. Typically, tuners are provided that tune to a single channel within a traditional terrestrial electromagnetic wave transmission, a satellite transmission or a cable transmission. The limited resources often result in recording conflicts implying that a consumer is forced to decide which recordings should be made and sacrifice other programs. This is most often the case during prime time broadcast periods during which broadcasters take explicit decisions to broadcast popular programs at conflicting times with competing channels.

The increasing usage of recommender engines also has a large effect on the number of recording conflicts in Set-Top-Boxes, or equivalent devices, with limited resources. Recommender engines analyze a user's recording or viewing history to build up a profile and recommend programs that would be of interest to the user. Recommender engines can also automatically schedule recordings for a user, which again leads to recording conflicts on devices with limited resources.

A further development is the increasing use of computer technology within consumer devices, such as the use of computer networks to allow networks of consumer devices to be created. For example, a network of Set-Top-Boxes, often termed a network of peers, allows resources to be shared in a cost effective manner. In US 2005/0102698 A1, a system of Set-Top-Boxes is presented within which a Set-Top-Box assigns local resources to record programs for the user of the Set-Top-Box until the local resources are fully used. Thereafter, the Set-Top-Box contacts further peers within the network of peers to identify and use resources on the further peers. Whilst the sharing of resources within the network of peers can be beneficial in cases where the further peers have many resources available it has been found in practice that in many cases there are, in fact, no resources available on the further peers. The inventors recognizing this problem devised the present invention.

BRIEF SUMMARY OF THE INVENTION

It is an object of the present invention to improve the sharing of resources in a network of peers.

Accordingly, there is provided, in a first aspect of the present invention, a method for sharing resources in a network of peers, the method comprising the method steps of receiving a plurality of desired recording lists and a plurality of available resources lists within the network of peers, coordinating the plurality of desired recording lists and the plurality of available resources lists and compiling at least one assignment list for at least one peer comprised within the network of peers and communicating the at least one assignment list to the at least one peer comprised within the network of peers.

The formation of desired recording lists, i.e. wish lists of programs to be recorded, over the complete network of peers in combination with a list of resources provided by the peers allows the resources to be more efficiently used by coordinating the tasks across the complete network of peers as opposed to initially assigning local resources to local recordings until the local resources are fully assigned and then consulting the network of peers for further available resources to satisfy the local recordings. In the present invention, common wishes can be commonly addressed such that the popular programs are not recorded by the majority of peers, relieving resources in the network for the recording of a wider selection of programs and therefore to a wider choice of recorded programs for the users. It is therefore beneficial to perform the coordination at the level of desired recordings, i.e. wishes, rather than at the level of physical resources, e.g. tuners.

According to a second aspect of the invention a method is provided for sharing resources in a network of peers, the method comprising the method steps of generating a desired recording list and an available resources list on at least one peer comprised within the network of peers, transmitting the desired recording list and the available resources list to a coordinating peer comprised within the network of peers, receiving at least one assignment list on the at least one peer from the coordinating peer and executing on the at least one peer at least one assignment comprised within the at least one assignment list using resources available to the at least one peer.

According to a third aspect of the invention a system is provided for sharing resources in a network of peers, the system comprising a coordinator and a plurality of peers, wherein each peer comprised within the plurality of peers further comprises a means to generate a desired recording list, a means to generate an available resources list, a means to transmit the desired recording list and the available resources list to the coordinator, a means to receive an assignment list for each peer from the coordinator, a means for executing at least one assignment comprised within the assignment list and wherein the coordinator further comprises a means to receive the desired recording list and the available resources list from each peer comprised within the plurality of peers, a means to compile the assignment list for each peer based upon the desired recording list and the available resources list received from each peer comprised within the plurality of peers and a means for transmitting the assignment list for each peer to the plurality of peers.

According to a fourth aspect of the invention a device is provided for sharing resources in a system comprising a plurality of peers and a coordinator, the device comprising a means to generate a desired recording list, a means to generate an available resources list, a means to transmit the desired recording list and the available resources list to the coordinator, a means to receive an assignment list from the coordinator and a means for executing at least one assignment comprised within the assignment list using resources on the device.

According to a fifth aspect of the invention a device is provided for sharing resources in a system comprising a plurality of peers, the device comprising a means to receive a plurality of desired recording lists and a plurality of available resources lists from the plurality of peers, a means to coordinate the plurality of desired recording lists and the plurality of available resources lists and compile at least one assignment list based upon the plurality of desired recording lists and the plurality of available resources lists received from the plurality of peers and a means for transmitting the at least one assignment list to the plurality of peers.

According to a sixth aspect of the invention a program element is provided directly loadable into the memory of a programmable device, comprising software code portions for performing, when said program element is run on the device, the method steps of receiving a plurality of desired recording lists and a plurality of available resources lists within a network of peers, coordinating the plurality of desired recording lists and the plurality of available resources lists and compiling at least one assignment list for at least one peer comprised within the network of peers and communicating the at least one assignment list to the at least one peer comprised within the network of peers.

According to a seventh aspect of the invention a program element is provided directly loadable into the memory of a programmable device, comprising software code portions for performing, when said program element is run on the device, the method steps of generating a desired recording list and an available resources list on at least one peer comprised within a network of peers, transmitting the desired recording list and the available resources list to a coordinating peer comprised within the network of peers, receiving at least one assignment list on the at least one peer from the coordinating peer and executing on the at least one peer at least one assignment comprised within the at least one assignment list using resources available to the at least one peer.

According to an eighth aspect of the invention a computer-readable medium is provided directly loadable into the memory of a programmable device, comprising software code portions for performing, when said code portions are run on the device, the method steps of receiving a plurality of desired recording lists and a plurality of available resources lists within a network of peers, coordinating the plurality of desired recording lists and the plurality of available resources lists and compiling at least one assignment list for at least one peer comprised within the network of peers and communicating the at least one assignment list to the at least one peer comprised within the network of peers.

According to a ninth aspect of the invention a computer-readable medium is provided directly loadable into the memory of a programmable device, comprising software code portions for performing, when said code portions are run on the device, the method steps of generating a desired recording list and an available resources list on at least one peer comprised within a network of peers, transmitting the desired recording list and the available resources list to a coordinating peer comprised within the network of peers, receiving at least one assignment list on the at least one peer from the coordinating peer and executing on the at least one peer at least one assignment comprised within the at least one assignment list using resources available to the at least one peer.

In one embodiment a plurality of satisfaction values, e.g. recording priorities, may be determined comprising a satisfaction value for each peer comprised within the network of peers, the satisfaction value being an indication of a level of satisfaction of each peer with the at least one assignment list and the at least one assignment list may be optimized based upon the plurality of satisfaction values determined. This allows resources to be fairly assigned throughout the network of peers for the fulfillment of the wishes of each peer.

In a further embodiment a sum of the plurality of satisfaction values may be determined and the at least one assignment list may be optimized based upon the sum. This provides a simple but fair arrangement to assign resources throughout the network of peers for the fulfillment of the wishes of each peer.

In another embodiment a weight indicator for each peer comprised within the network of peers may be determined and subsequently a weighted sum may be determined based upon the weight indicator for each peer. Then the at least one assignment list may be optimized based upon the weighted sum. This allows the peers to be differentiated, for example, if they provide more resources than other peers. Such peers may be rewarded with a higher weighting.

In yet another embodiment a minimum amongst the plurality of satisfaction values may be determined and the at least one assignment list may be optimized based upon the minimum determined. This is computationally simple whilst ensuring that each and every peer receives a reasonable quality of service.

In an embodiment the at least one assignment list may be optimized using a bipartite graph matching algorithm. This allows maximization of the total number of recorded programs by determining a maximal cardinality matching in the constructed graph, which can be done efficiently.

In another embodiment at least one provisional assignment list may be determined with a plurality of satisfaction values comprising a satisfaction value for each peer comprised within the network of peers, the satisfaction value for each peer being an indication of a level of satisfaction of each peer with the at least one provisional assignment list. An overall satisfaction value may then be determined from the plurality of satisfaction values and the at least one assignment list may be assigned to be equal to the at least one provisional assignment list when the overall satisfaction value is maximized. Such an iterative method is useful in cases where the satisfaction value or the overall satisfaction value are non-linear functions or when a large number of variables are involved in determining an optimal at least one assignment list.

In another embodiment at least one updated desired recording list may be received and the at least one updated desired recording list may be further coordinated with the plurality of desired recording lists and the plurality of available resources lists to compile an updated assignment list for each peer comprised within the network of peers. The updated assignment list for each peer may be communicated to each peer comprised within the network of peers. These features allow users of the peers to interactively change the desired recordings and so improve the satisfaction of the users.

In a further embodiment the plurality of desired recording lists might comprise a recording entry, the recording entry further comprising a selection of at least one of a unique program identifier, a user recognizable program identifier, a requester identifier, a priority indicator and a weight indicator. These identifiers and indicators are useful for identifying programs to be recorded, the peer for which the programs should be recorded and for coordinating and compiling assignment lists.

In an embodiment the plurality of available resources lists might comprise a resource entry, the resource entry further comprising a selection of at least one of a device identifier, a resource identifier, a resource quantity indicator and a resource availability indicator. These identifiers and indicators are useful for identifying peers that have resources available that are also capable of recording programs for fellow peers.

In a further embodiment the at least one assignment list may comprise an assignment entry, the assignment entry further comprising a selection of at least one of a unique program identifier, a user recognizable program identifier, a requester identifier and a value indicator. These identifiers and indicators are useful for informing a peer what actions are required to be taken by the peer and for which fellow peer the peer is performing the actions. This allows the peers to directly exchange status information and recordings.

In another embodiment input may be received from a user interface or recommender unit, the input indicating programs desired to be recorded and the desired recording list may be compiled from the input. Such methods of indicating programs to be recorded have been found to be convenient for users of consumer electronics devices.

In a further embodiment the network of peers may negotiate to determine the coordinating peer prior to transmitting the desired recording lists or the available resources lists. This allows the network to be fault tolerant by not relying upon a single coordinator or coordinating unit.

In another embodiment a recording to be retrieved may be identified along with an assigned peer, the assigned peer being a peer assigned to record the recording to be retrieved. Then the recording may be retrieved from the assigned peer. The technical features allow a receiving peer to determine when the recording to be retrieved is available at the receiving peer.

In one embodiment a recording to be distributed may be identified along with at least one target peer, the at least one target peer being a peer that requested recording of the recording to be distributed. Then the recording to be distributed may be distributed to the at least one target peer. These technical features allow a so-called push model similar to a traditional broadcast model to be implemented. This is efficient when multiple target peers have requested the same program to be distributed.

In an embodiment a recording to be deleted on a local peer may be identified along with at least one target peer, the at least one target peer being a peer that requested recording of the recording to be deleted. The recording to be deleted from the local peer may be distributed to the at least one target peer prior to deleting the recording to be deleted on the local peer. This ensures that the target peer continues to have access to any program recorded on behalf of the target peer by the local peer.

In a further embodiment update input may be received from a user, the update input indicating an update to the desired recording list and the update to the desired recording list may be transmitted to the coordinating peer comprised within the network of peers. An updated assignment list may be received from the coordinating peer and at least one updated assignment comprised within the updated assignment list may be executed, in place of the at least one assignment comprised within the at least one assignment list, using resources available to the at least one peer. These technical features ensure that any changes made by the users are taken into account and that the most recent assignments are performed by each peer.

In another embodiment the negotiation may be arranged to make use of an election algorithm. Such an algorithm is simple to implement and fair in use.

In another embodiment the election algorithm may be bully or a ring algorithm. Such algorithms are simple to implement and render the network fault tolerant to the loss of a coordinator.

In a further embodiment a device according to the invention may be realized as at least one of the group consisting of a Set-Top-Box device, a digital video recording device, a network-enabled device, a conditional access system, a portable audio player, a portable video player, a mobile phone, a DVD player, a CD player, a hard disk based media player, an Internet radio device, a computer, a television, a public entertainment device and an MP3 player. However, these applications are only exemplary.

In another embodiment a device according to the invention may further comprise a means to generate a local desired recording list, a means to generate a local available resources list and a means for executing at least one local assignment comprised within a local assignment list using resources on the device. The local assignment list and the at least one assignment list may be compiled based upon the plurality of desired recording lists, the local desired recording list, the plurality of available resources lists and the local available resources list. These technical features allow a single device on the network to behave as a peer and a coordinator, thereby reducing the number of devices on the network and the related cost of providing separate devices.

The data processing required according to the invention can be realized by a computer program, that is to say by software, or by using one or more special electronic optimization circuits, that is to say in hardware, or in hybrid form, that is to say by means of software components and hardware components.

The aspects defined above and further aspects of the invention are apparent from the examples of embodiment to be described hereinafter and are explained with reference to these examples of embodiment.

BRIEF DESCRIPTION OF THE DRAWINGS

The invention will be described in more detail hereinafter with reference to examples of embodiment but to which the invention is not limited.

FIG. 15 illustrates a method for coordinating, compiling and optimizing the assignment list based upon the determination of a plurality of satisfactions values.

FIG. 16a illustrates a first method for optimizing the assignment list based upon a sum of the plurality of satisfactions values.

FIG. 16b illustrates a second method for optimizing the assignment list based upon a weighted sum of the plurality of satisfactions values.

FIG. 16c illustrates a third method for optimizing the assignment list based upon the maximization of the minimum amongst the set of the plurality of satisfactions values.

Figure 1:
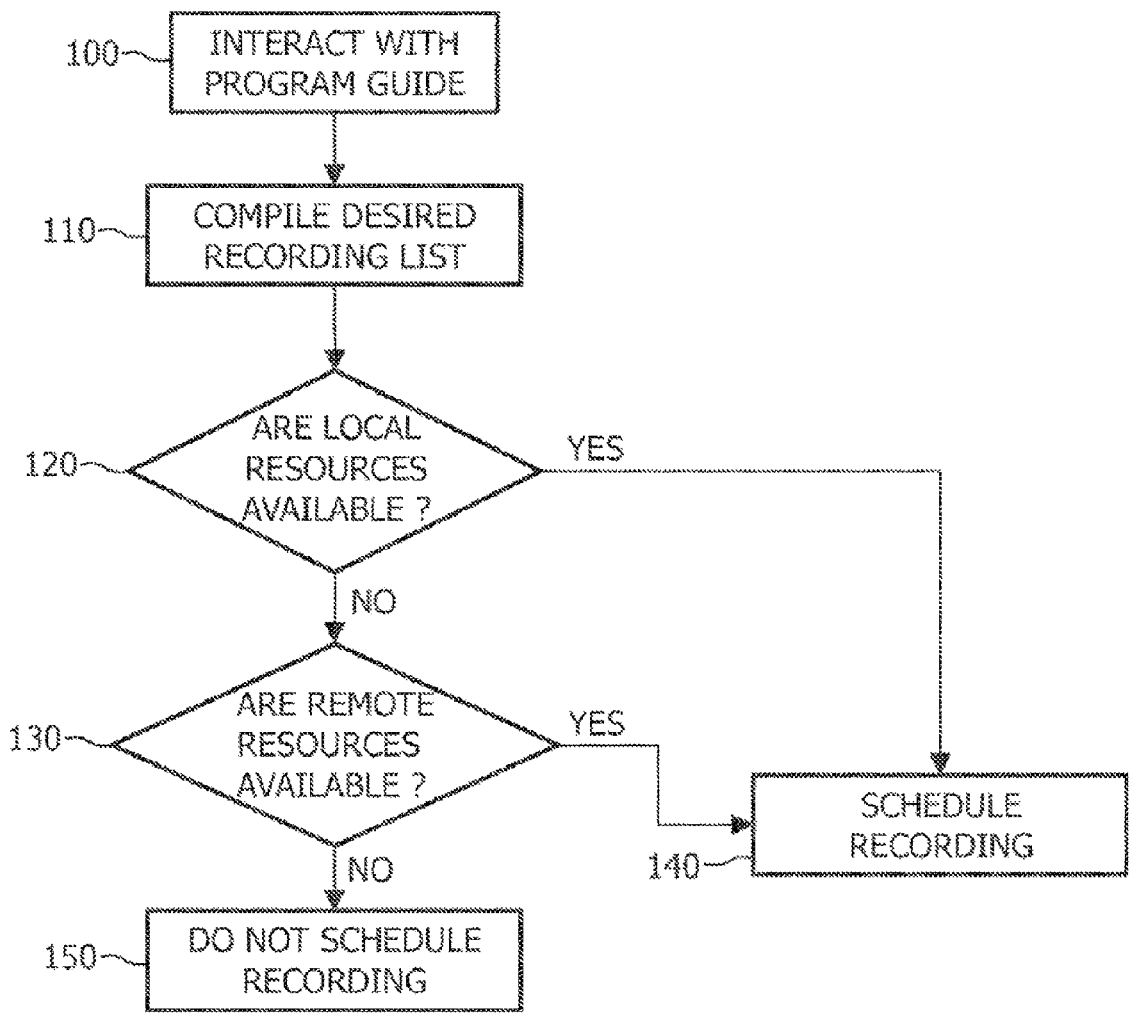
FIG. 1 illustrates a method for sharing resources known from the prior-art.

The Figures are schematically drawn and not true to scale, and the identical reference numerals in different Figures refer to corresponding elements. It will be clear for those skilled in the art, that alternative but equivalent embodiments of the invention are possible without deviating from the true inventive concept, and that the scope of the invention will be limited by the claims only.

DETAILED DESCRIPTION OF THE INVENTION

In the following the term peer is prevalently used. The term peer is defined as a unit of communications hardware or software that is on the same protocol layer of a network as another. Communications links generally comprise two protocol stacks, which are actually connected only at the very lowest (physical) layer, for example, via a wired Ethernet or wireless Bluetooth or WiFi interface. However, the two protocol stacks can be regarded as being connected at each higher layer by virtue of the services provided by the lower layers. Peer-to-peer communication refers to these real or virtual connections between corresponding systems in each layer. Furthermore, a peer may act as both client and server.

A peer-to-peer (or P2P) computer network is a network that relies on the computing power and bandwidth of the participants in the network rather than concentrating it in a relatively low number of servers. Peer-to-peer networks are typically used for connecting nodes via largely ad hoc connections. Such networks are useful for many purposes. Sharing content files, i.e. file sharing, containing audio, video, data or anything in digital format is very common, for example using the known systems of Kazaa, eMule and Napster, and real-time data, such as telephony traffic, is also passed using peer-to-peer technology, such as by the Skype system.

A pure peer-to-peer network does not have the notion of clients or servers, but only equal peer nodes that simultaneously function as both "clients" and "servers" to the other nodes on the network. This model of network arrangement differs from the client-server model where communication is usually to and from a central server. Hybrid peer-to-peer networks also exist that make use of a combination of peer-to-peer connections and client-server connections for the various services offered, for example, for network search services and data transfer services.

A peer as defined here may, therefore, be understood to represent any physical device on the network capable of communicating with another physical device on the network at the protocol level necessary to practice the present invention. Examples of typical peer devices are a Set-Top-Box device, a digital video recording device, a network-enabled device, a conditional access system, a portable audio player, a portable video player, a mobile phone, a DVD player, a CD player, a hard disk based media player, an Internet radio device, a computer, a television, a public entertainment device and an MP3 player.

The convergence of personal computer related technologies, i.e. networking and peer-to-peer technology in particular, with Consumer Electronics devices has generated enormous possibilities in sharing resources throughout the network. This enables the end user cost of devices to be kept low, which is an attractive proposition to both an end-user and a service provider who provides the hardware at a subsidized rate, or even free, in combination with the service of the service provider.

One example of the possibility of sharing resources throughout a network is that of sharing tuners and/or storage. Generally only a very limited number of tuners are present in a Consumer Electronics device, typically one or two. Referring to FIG. 1, a method is shown for sharing resources in a network of peers known from the prior art. In step 100 a user interacts in the known manner with a program guide, generally in the form of an Electronic Program Guide (EPG). Typical EPGs address programs covering many channels, in the order of hundreds, and the information regarding the programs can range in time span from the now and next programs to numerous weeks in advance. The large choice inevitably leads to a situation where users can very easily have recording conflicts. A recording conflict is defined as a point in time where the user's device does not have the physical resources to carry out all of the users wishes. Typically, this occurs at prime time when broadcasters simultaneously broadcast their most popular content to directly compete for the user's attention and thereby increase their advertising revenue.

The user interaction with the EPG identifies programs that the user would like to record and allows the compilation of the user's desired recording list in step 110. In step 120 it is checked whether local resources are available to carry out the user's wishes. If so, then in step 140 the recording is scheduled, in this case using the local resources. If there are no local resources available, then other devices on the network, i.e. peers, are consulted in step 130 and resources are requested from the peers to schedule the recording, i.e. again in step 140. Should no resources be available at all then the recording cannot be scheduled as shown in step 150. It has been found that using such a method to assign local resources first leads to a situation where all peer devices tend to record the same (popular) programs and therefore the situation described by step 150 occurs at a significantly higher rate than the users would wish. In a case when multiple interesting TV programs are broadcast at the same time, each user has to choose which one to record. Generally the manner of choosing is performed in an interactive manner with each user or by using preconfigured priorities for the different programs. In any case, the above may lead to a situation that, for example, three friends are interested in three programs that are broadcast simultaneously, and all three decide to record the same program. Each user therefore can only view one program from the three that each user had originally wanted to record. However, if their preferences would be coordinated, each of them could record a different program, and they could share them. In this way, all three users can watch all three programs.

Figure 6:
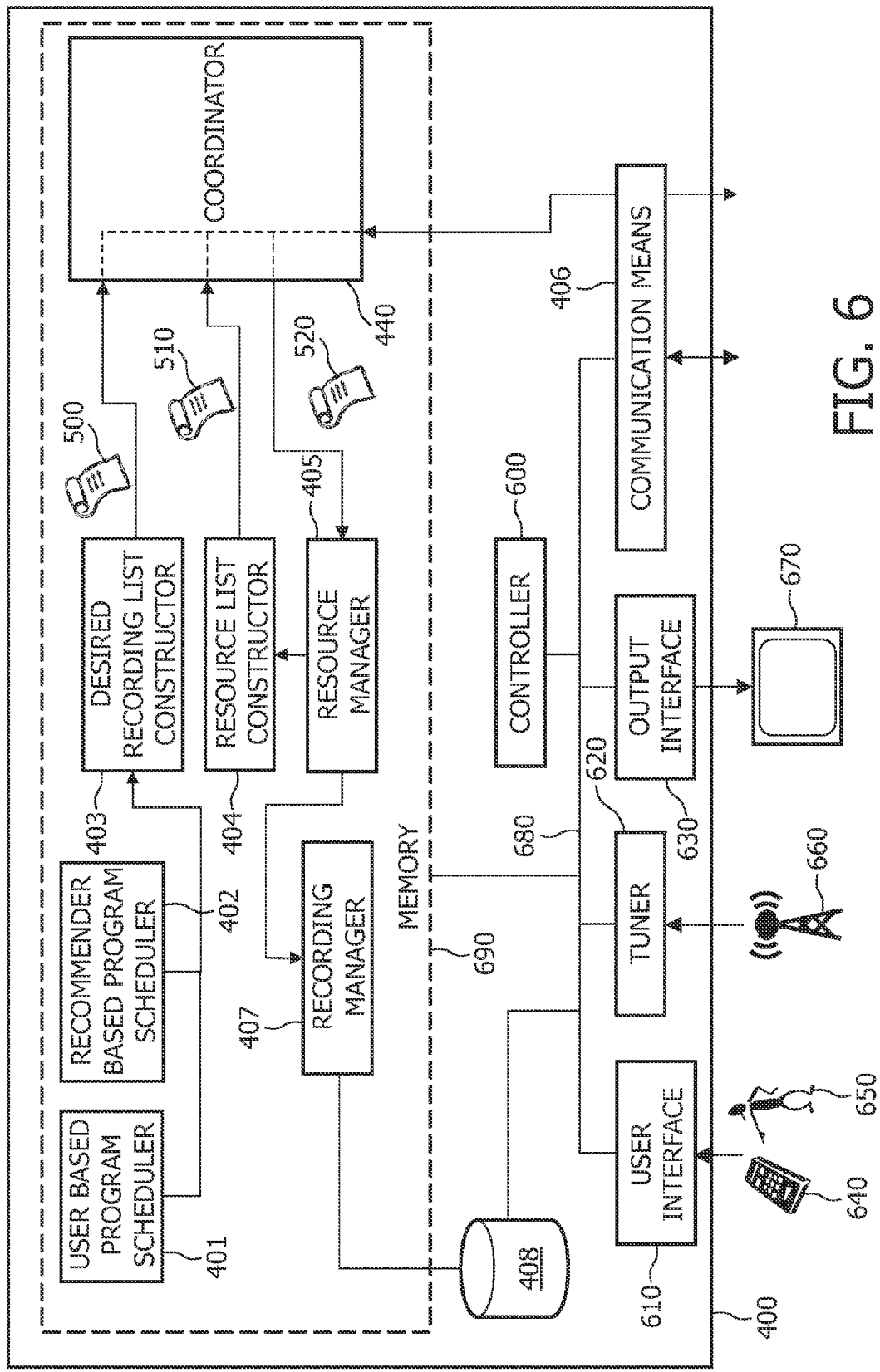
FIG. 6 illustrates a device for sharing resources according to an exemplary embodiment of the invention.

Referring to FIG. 6 a first peer 400 is shown comprising a controller 600, also known as a control unit or CPU, a user interface 610 for receiving commands from a user 650 using a remote control 640, a tuner 620 for receiving a signal from a broadcast source 660, an output interface 630 for connecting the first peer 400 to a display unit 670, a storage unit 408 for storing recorded programs, a memory 690 wherein data processes running on the controller 600 may reside, a communication means 406, such as an Ethernet, WiFi or Bluetooth connection and a system bus 680 for the interconnection of the individual components. The first peer 400 may also comprise a user based program scheduler 401 for scheduling programs to be recoded in an interactive manner with the user 650. Optionally, a recommender-based program scheduler 402 may also be used. A desired recording list constructor 403 accepts input from the user based program scheduler 401 and/or the recommender-based program scheduler 402 and compiles a local desired recording list 500 comprising programs that the user wishes to record, i.e. a wish list of recordings. The first peer 400 may also comprise a resource list constructor 404. The resource list constructor 404 may construct a local available resource list 510 from information obtained from a resource manager 405. The resource manager 405 manages the resources in the first peer 400. Managed resources may include storage space on the storage unit 408, tuner 620, memory 690, network bandwidth, bandwidth on the system bus 680, etc.

The local desired recording list 500 and the local available resource list 510 may be communicated to a coordinator unit 440 comprised within the first peer 400. The coordinator unit 440 may also receive further desired recording lists and further available resource lists via the communication means 406 and coordinate the plurality of desired recording lists and the plurality of available resource lists to compile an assignment list for each peer comprised within the network of peers. Each assignment list may comprise one or more assignments that a peer should perform to provide optimal recording according to the combined wishes of all users using the resources available to the whole network of peers. For example, the coordinator unit 440 may compile a local assignment list 520 for the first peer 400 and a plurality of assignment lists for the other peers sharing resources within the network. In the exemplary embodiment of FIG. 6 the local assignment list 520 is communicated from the coordinator unit 440 to the resource manager 405 that then assigns resources to a recording manager 407, responsible for managing the actual recording of programs using the resources available to it. The recording manager 407 ensures that a program received via the tuner 620 from the broadcast source 660 is recorded on the storage unit 408.

In the exemplary embodiment of FIG. 6 a number of components are illustrated as being implemented as software processes running on the controller 600 in the memory 690. Equivalent hardware implementations are also possible.

Figure 5:
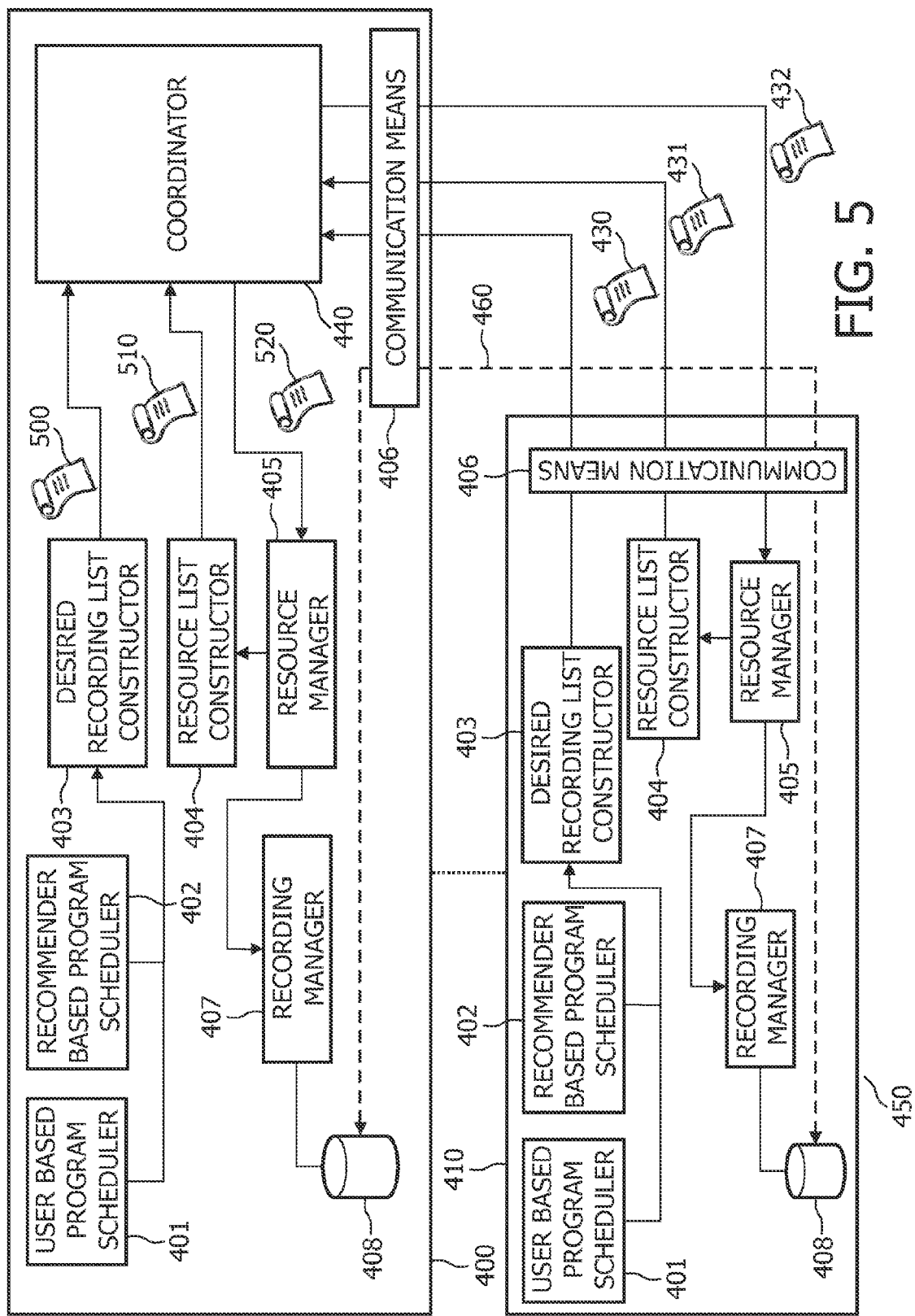
FIG. 5 illustrates a second system and co-operating devices for sharing resources according to an exemplary embodiment of the invention.

The system of FIG. 5 illustrates a further peer 410 connected in a network of peers with the first peer 400 via communications means 406 present in each peer. The further peer 410 may be substantially identical to the first peer 400, and operate in a similar manner as described in the description related to FIG. 6. The further peer 410 may be arranged to determine a further desired recording list 430 in a similar manner to the first peer 400 using desired recording list constructor 403. The further peer 410 may also be arranged to determine a further available resources list 431 indicating resources available within the further peer 410 in a similar manner to the first peer 400 using available resources list constructor 404. The further peer 410 is further arranged to communicate the further desired recording list 430 and the further available resources list 431 to the coordinator unit 440 using the communication means 406.

The coordinator unit 440 receives the further desired recording list 430 and the further available resources list 431, coordinates the received lists with lists compiled by other peers comprised within the network of peers and coordinates the complete plurality of desired recording lists and the plurality of available resources lists to compile a plurality of assignments lists. One or more assignment lists may be created for each peer comprised within the network of peers. In the embodiment shown in FIG. 5, the coordinator unit 440 creates a further assignment list 432 that the coordinator unit 440 communicates to the further peer 410 via communications means 406, which may be a network interface. Resource manager 405 then assigns resources to a recording manager 407, responsible for managing the actual recording of programs using the resources available to it. The recording manager 407 again ensures that a program received via the tuner 620 from the broadcast source 660 is recorded on the storage unit 408; these items are not shown for the further peer 410. After execution of each assignment in the further assignment list 432, the further peer 410 can exchange the recorded programs via a recording exchange path 460 in a peer-to-peer manner, without requiring any involvement of the coordinator unit 440, or another central server. The resource manager 405 may, however, be involved.

Figure 4:
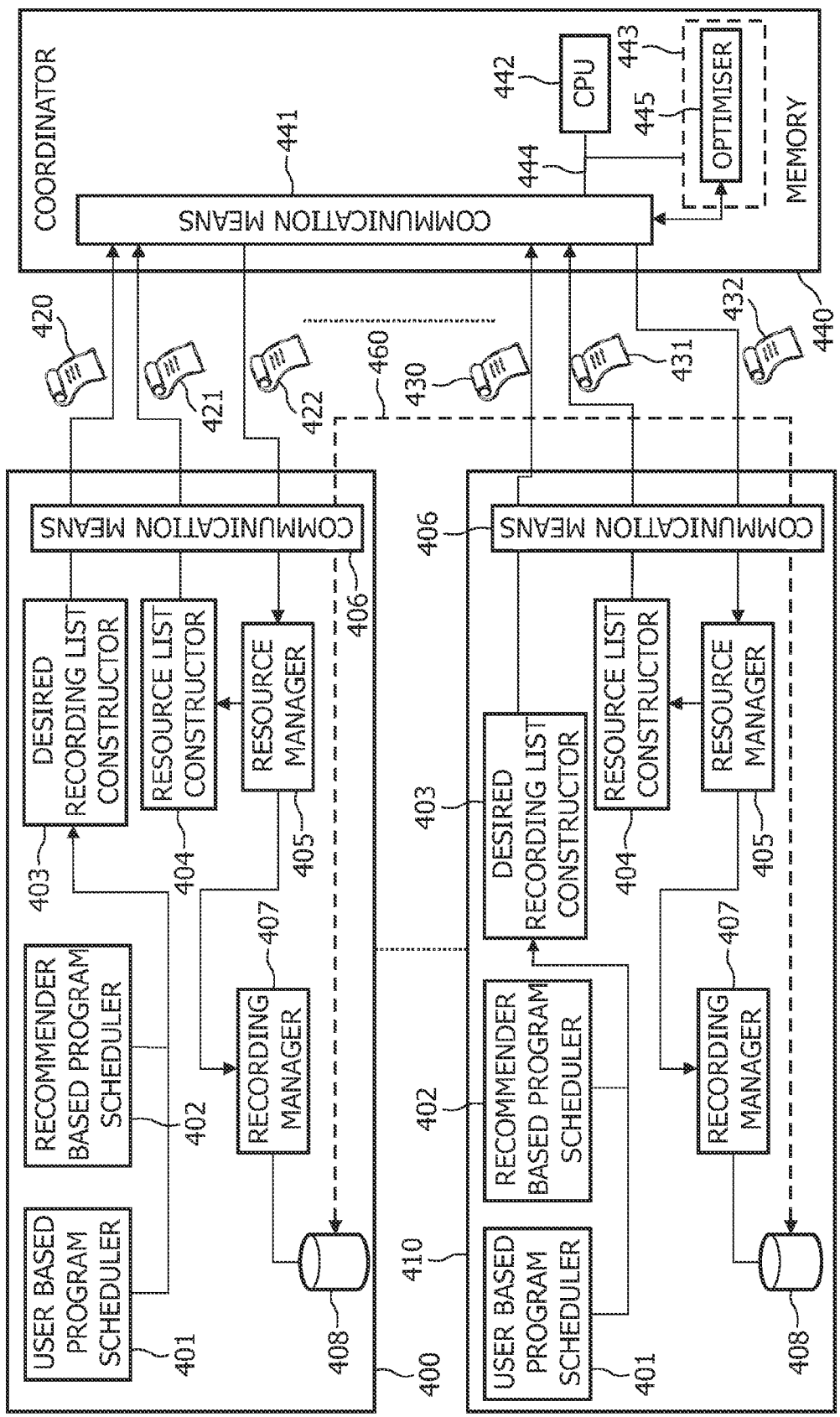
FIG. 4 illustrates a system and co-operating devices for sharing resources according to an exemplary embodiment of the invention.

A further exemplary embodiment is illustrated in FIG. 4. The coordinator unit 440 may be a separate entity, or peer, comprised within the network of peers. It may reside on a server, for example, as a World Wide Web community service, as commonly implemented on the Internet. In FIG. 4 the coordinator unit 440 comprises a control unit 442, which may, for example, be a general purpose CPU and be similar or identical to the controller 600 as used in the first peer 400. The coordinator unit 440 may also comprise a communication interface 441, similar or identical to the communication means 406 of the first peer 400. Memory unit 443 may be employed to enable the coordinator unit 440 to perform processing tasks running on the control unit 442, such as an optimizer task 445. The optimizer task 445 being a task that optimizes assignment lists compiled by the coordinator unit 440. A system interconnect 444 acts as a system bus connecting the components comprised within the coordinator unit 440 together.

In operation, the first peer 400 is arranged to compile a first desired recording list 420 and a first available resources list 421, in a similar manner to that described in the description relating to FIG. 6. The first peer 400 communicates the first desired recording list 420 and the first available resources list 421 to the coordinator unit 440. The coordinator unit 440 in turn receives a plurality of desired recording lists and available resources lists from the peers comprised within the network and coordinates the wishes expressed by all of the users of the network and compiles at least one assignment lists for at least one peer. Generally a plurality of assignment lists may be compiled for a plurality of peers comprised within the network. The operation of the coordinator unit 440 has been described earlier in relation to FIG. 5 and FIG. 6. After execution of each assignment in any of the assignment lists compiled on any peer, the corresponding peer can exchange the recorded programs via the recording exchange path 460 in a peer-to-peer manner to any other peer that had requested the recording of the recorded program. Again, this may occur without requiring any involvement of the coordinator unit 440, or another central server.

Figure 2:
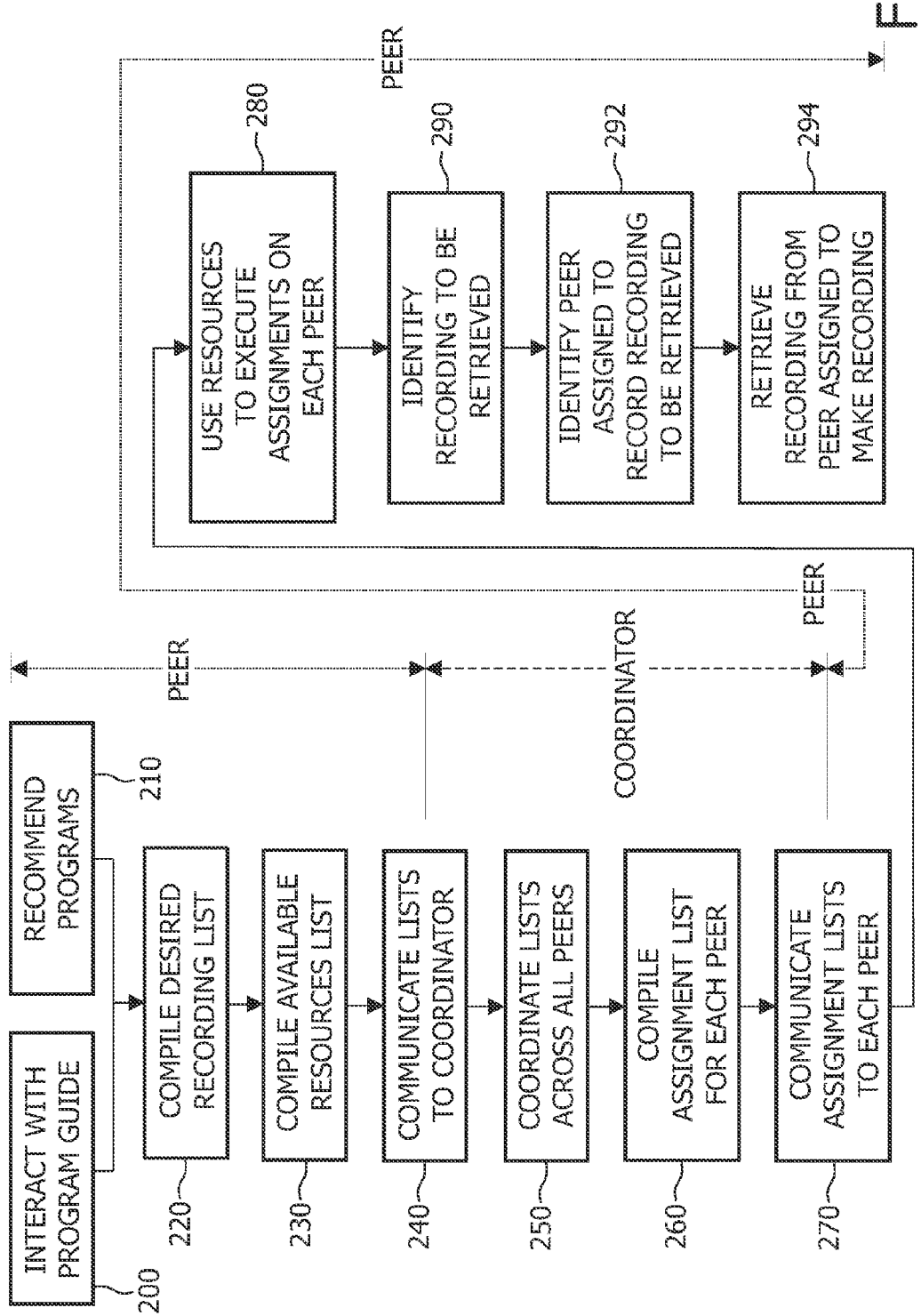
FIG. 2 illustrates a method for sharing resources according to an exemplary embodiment of the invention.

Further elucidation is provided by the flowchart shown in FIG. 2 where a flowchart is provided describing an exemplary method according to the present invention. This method, or parts thereof, may be used in the controller 600 and/or the control unit 442. In step 200 the user 650 interacts in the normal manner with an EPG to view the offering of programs using the user based program scheduler 401. Such interaction would usually take place by making use of the remote control 640, the user interface 610 and the display unit 670. In a parallel step programs may also be recommended automatically in step 210, for example by the recommender based program scheduler 402. Such recommendation is generally based upon a recording or viewing profile of the user. In step 220 all programs that the user would wish to be recorded are collated. This may be implemented as the desired recording list constructor 403.

In step 230 a peer, for example, the first peer 400, compiles an available resource list and may use a resource list constructor and resource manager for this purpose. In step 240 the peer communicates the lists compiled to the coordinator unit 440. The communication can be locally communicated such as shown in the embodiment of FIG. 5 and FIG. 6 for first peer 400, or remotely communicated using a network interface as shown, for first peer 400, in the embodiment of FIG. 4.

In step 250 the coordinator unit 440 coordinates the plurality of desired recording lists and the plurality of available resources lists received from the peers comprised within the network and in step 260 compiles assignments for each peer that optimally satisfy the wishes of the users of the network. The optimization may be based upon a sum of priorities indicated by the users for each program to be recorded. Further examples of the optimization will be disclosed later in this description. In step 270 any assignment lists compiled are communicated to the corresponding peer, or peers, either locally or over a network interface.

In step 280 each peer executes one or more assignments comprised within the assignment list that the peer received from the coordinator unit 440. This will involve assigning local resources to complete the tasks and performing the actual recording. In step 290 a peer may subsequently identify a recording that should be retrieved using information in the assignment list. This can be achieved by noting that the start time of a program to be recorded for, for example, the first peer 400 has been reached. In this example the first peer 400 had requested a program be recorded and the assignment list had been communicated to the first peer 400 which indicated which peer had been assigned to perform the actual recording. This identification of the assigned peer 2050 is shown in step 292 of FIG. 2. In step 294 dependent upon available resources the first peer 400 could begin to retrieve the recording from the peer assigned to perform the actual recording immediately after recording had been started, or subsequently, for example, during the late evening or just after the recording was scheduled to end. A known peer-to-peer data exchange may be used to transfer the recorded program using recording exchange path 460.

Figure 9:
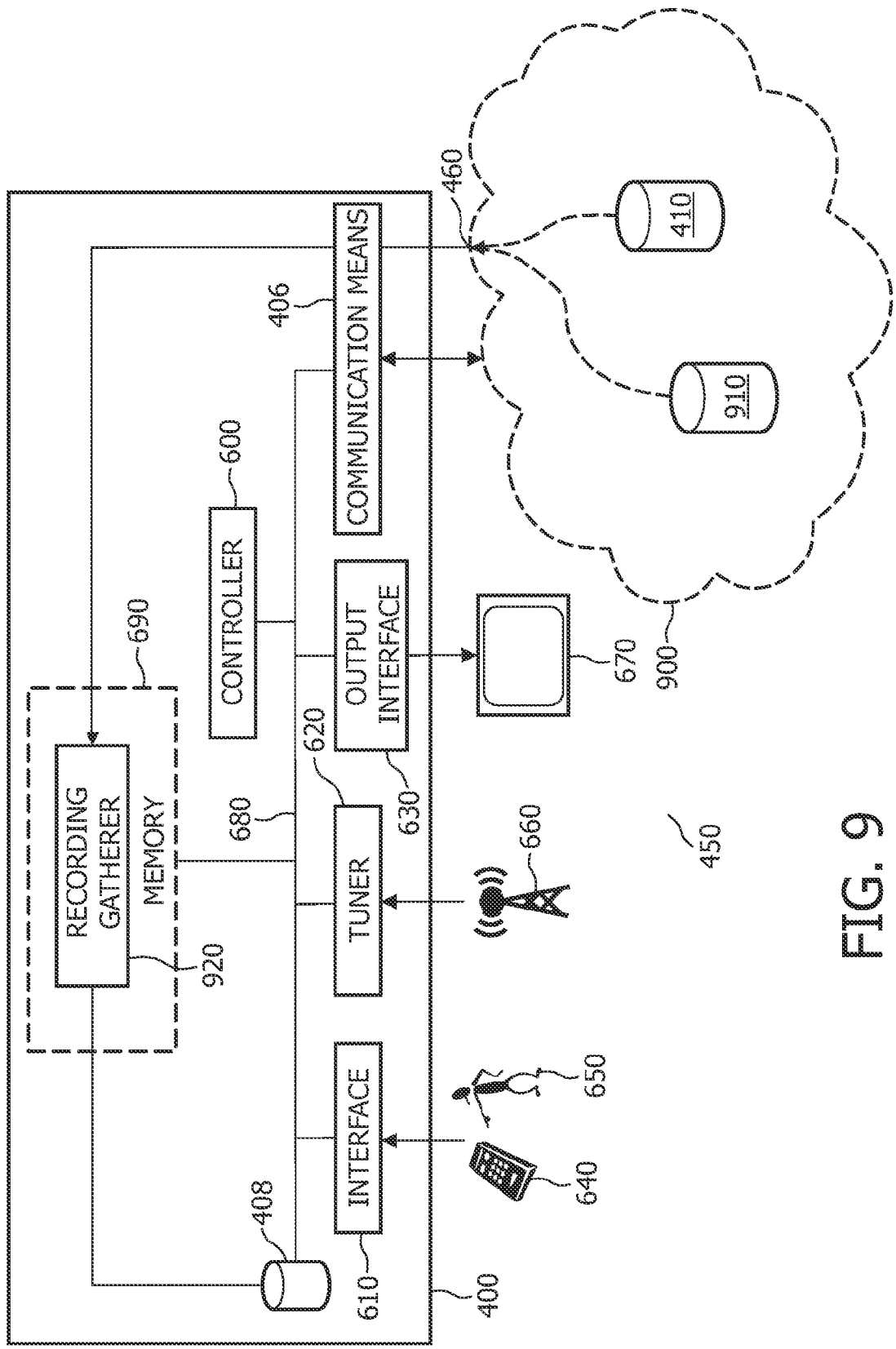
FIG. 9 illustrates a device for gathering recorded programs.

FIG. 9 illustrates the gathering of recordings in more detail. In FIG. 9 a system 450 comprising a network of peers 900 is shown which is communicatively coupled to the first peer 400. The network of peers 900 comprises the further peer 410 and a second further peer 910. The first peer 400 is shown to further comprise a recording gatherer 920 arranged to perform the method steps 290, 292 and 294 of FIG. 2. The recording gatherer 920 ensures that programs recorded on the further peer 410 and the second further peer 910 are transferred to the storage unit 408 of the first peer 400.

Figure 10:
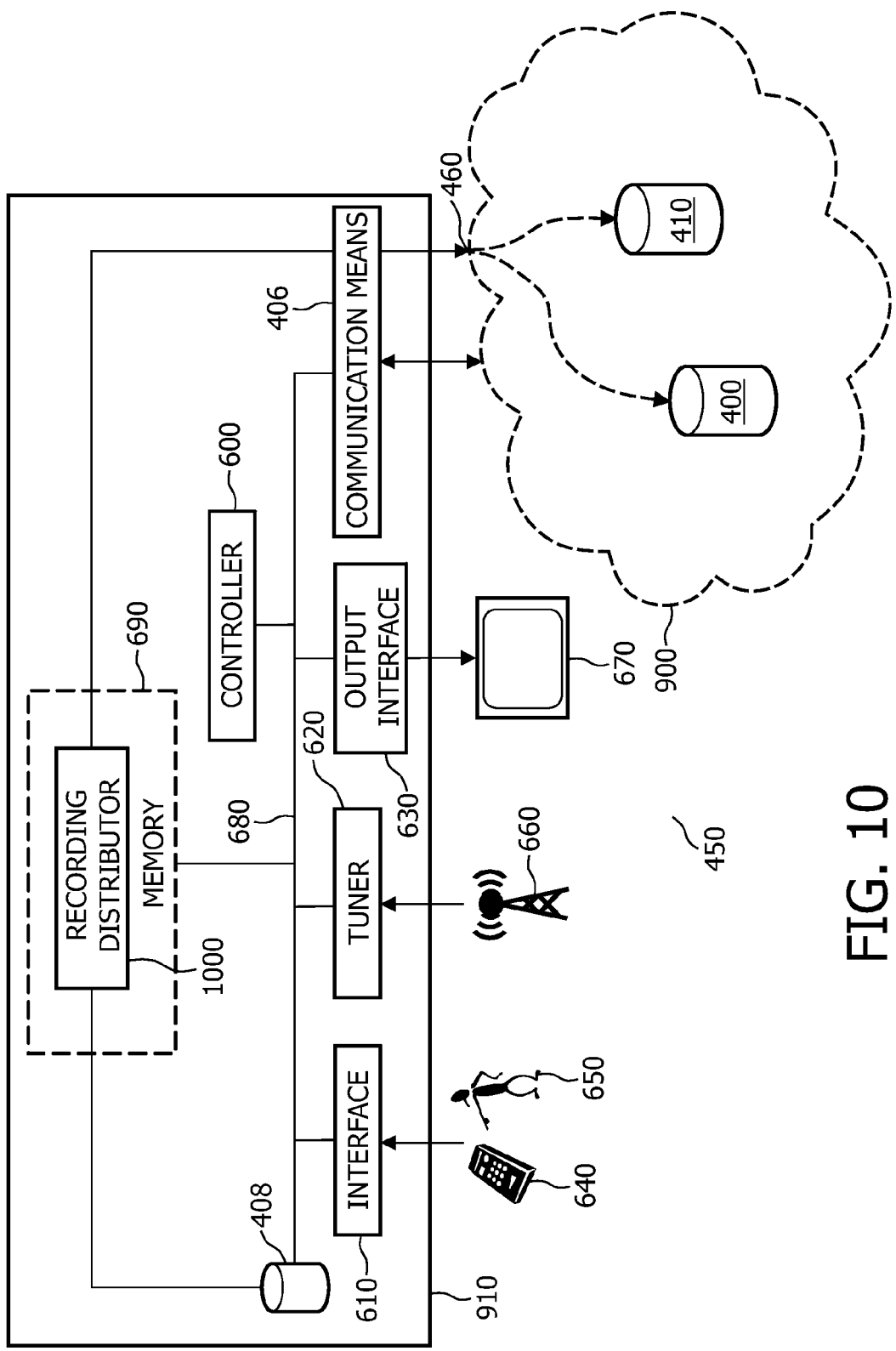
FIG. 10 illustrates a device for distributing recorded programs.

Alternatively, FIG. 10 illustrates another manner for the distribution of recordings. In FIG. 10 the network of peers 900 is shown which is communicatively coupled to the second further peer 910. The network of peers 900 now comprises the first peer 400 and the further peer 410. The second further peer 910 is shown to further comprise a recording distributor 1000 arranged to distribute recordings from the storage unit 408 in the second further peer 910 to a corresponding storage unit in the first peer 400 and the further peer 410, where in this example, both of these peers requested that the program be recorded. The distribution of recorded programs performed by the recording distributor 1000 may progress as shown in FIG. 12.

Figure 12:
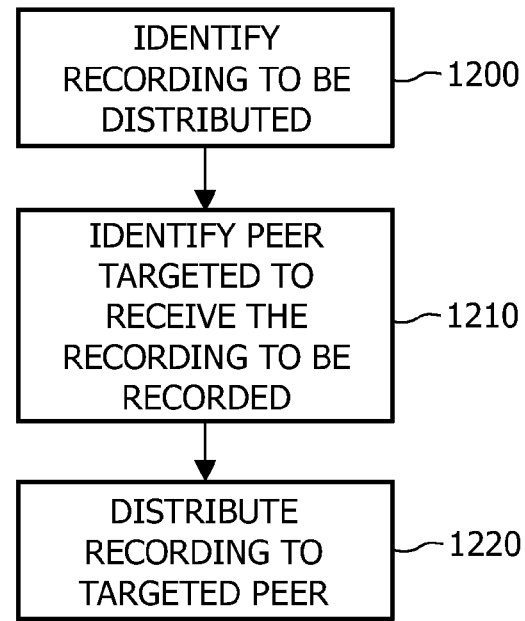
FIG. 12 illustrates a method for distributing recorded programs within a network of peers.

In the method shown in FIG. 12 the peer assigned to perform the actual recording, i.e. the second further peer 910 in this example, may also be arranged to identify recordings that are to be distributed. This is similar in nature to a traditional broadcast and is useful when many peers would have requested the same recording to be performed. Such a method is often termed a "push" model in the art. In step 1200 the peer assigned to perform the actual recording identifies, from an assignment list that it had received, that a recording should be distributed, i.e. that it is also of interest to other peers. In step 1210 the peer assigned to perform the actual recording then identifies, as target peers, the peers that had requested the recording be performed, again using the assignment list. In step 1220 the peer assigned to perform the actual recording initiates the transfer of the recorded programs to the corresponding target peers. A multicast or direct peer-to-peer transfer may be used for the actual transfer.

Figure 3:
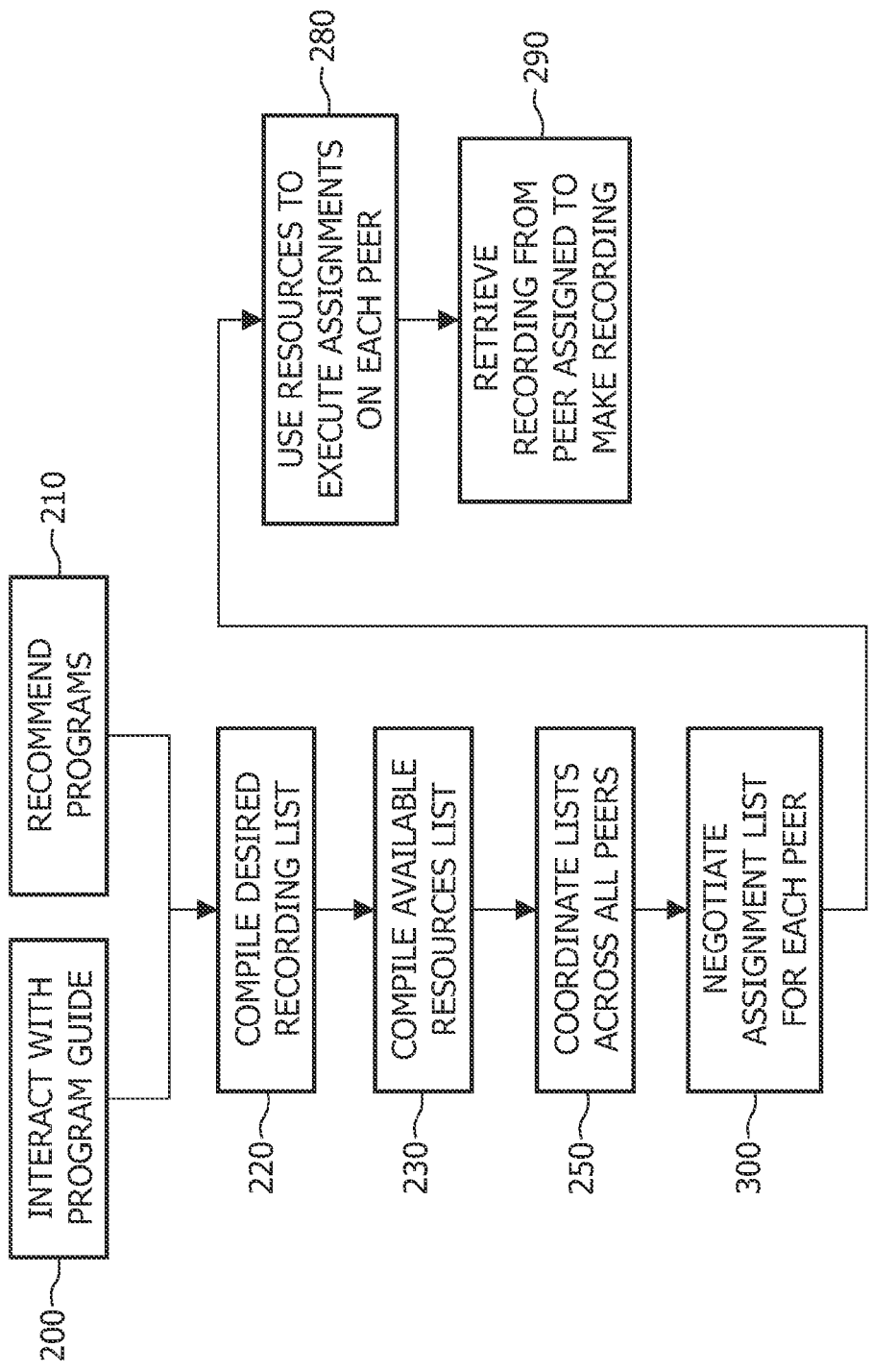
FIG. 3 illustrates a second method for sharing resources according to an exemplary embodiment of the invention.

In FIG. 3 a further method is illustrated in which the steps 260 and 270 of FIG. 2 are replaced by a negotiation step 300. In the negotiation step 300, the compilation and distribution of assignments is performed in a distributed manner. The functionality of the coordination unit 440 is therefore present, however, no coordination unit 440, as an entity per se exists. Such distributed processing is common in the art. The method of FIG. 3 is suitable for running on the controller 600 in memory 690.

Figure 7:
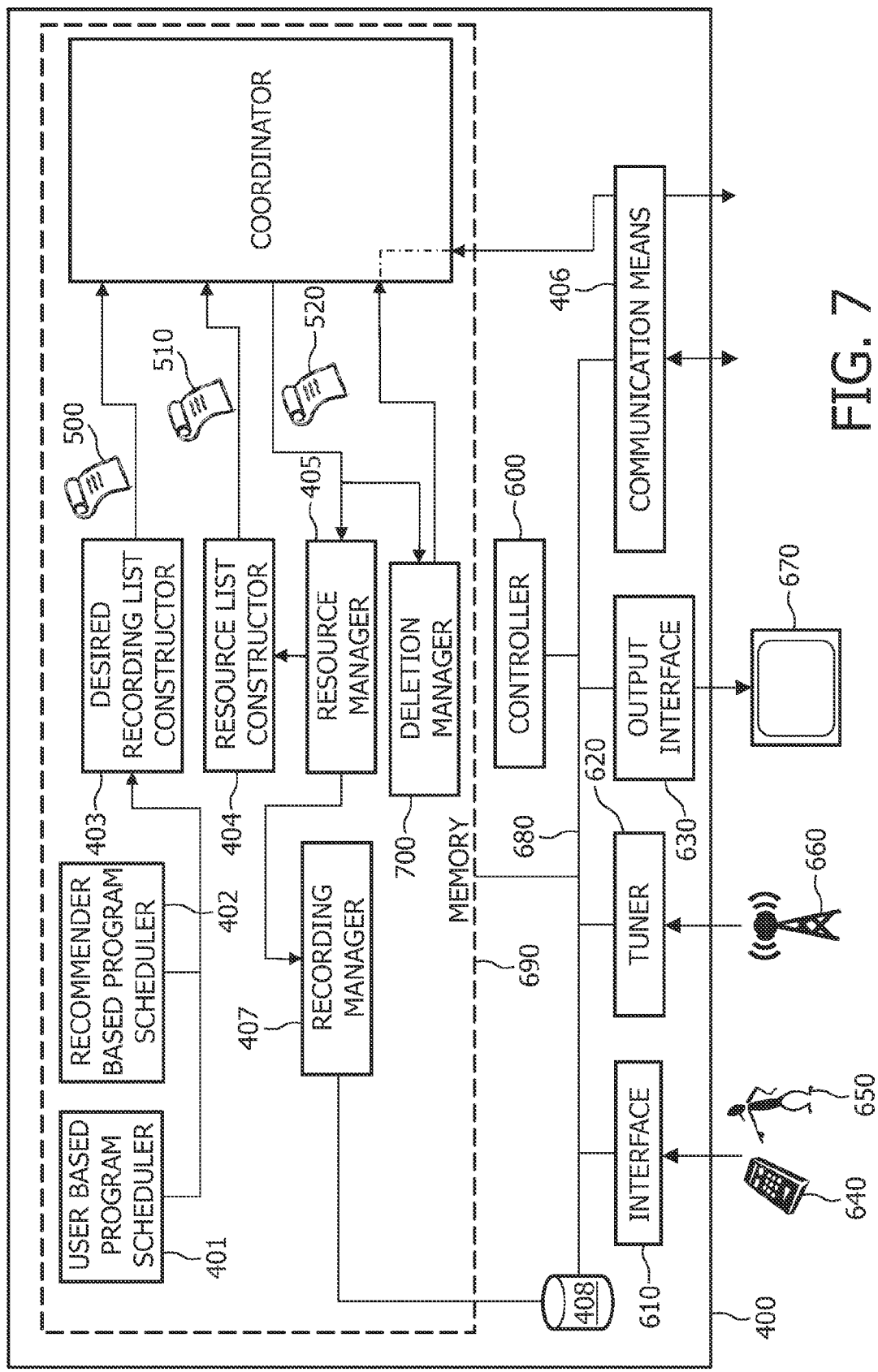
FIG. 7 illustrates a second device for sharing resources according to an exemplary embodiment of the invention.
Figure 13:
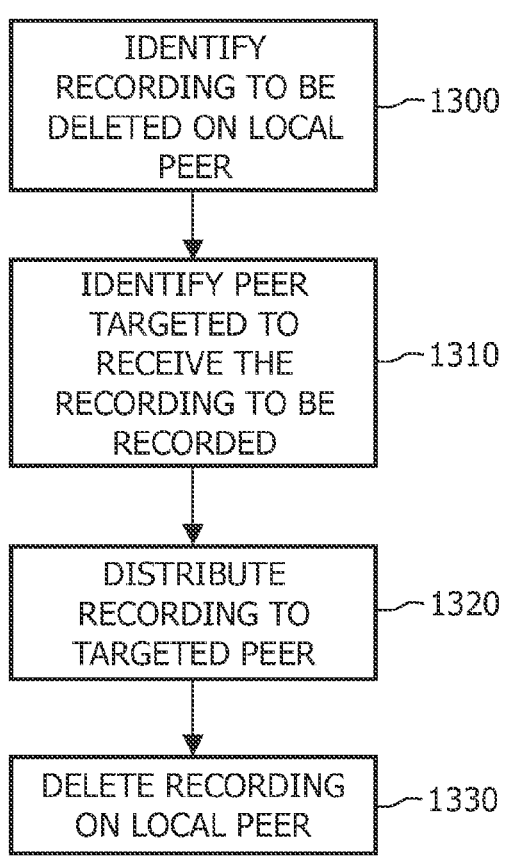
FIG. 13 illustrates a method for safely deleting recorded programs on a local peer comprised within a network of peers.

FIG. 7 illustrates a further exemplary embodiment of the present invention. The first peer 400 further comprises a deletion manager 700. In the embodiment, the deletion manager 700 may have access to local assignment list 520 and may use the information comprised within the local assignment list 520 to delay the deletion of programs on the first peer 400 until such time that the recorded programs have been retrieved by, or distributed to, any such peer that requested the recording be performed. A suitable method for safely deleting recordings is shown in FIG. 13, which prevents recorded programs being deleted too quickly. In step 1300, the user 650 may identify a recorded program to be deleted on a local peer, for example on the first peer 400, using remote control 640 and user interface 610. An assignment list may then be consulted to identify, in step 1310, for which peers, if any, the recording was performed. Prior to any deletion action the recorded program to be deleted may then be retrieved by, or distributed to, the peer that had requested the recording in step 1320. Finally, in step 1330, the deletion of the recorded program on the local peer, for example, the first peer 400, can be performed.

Figure 8:
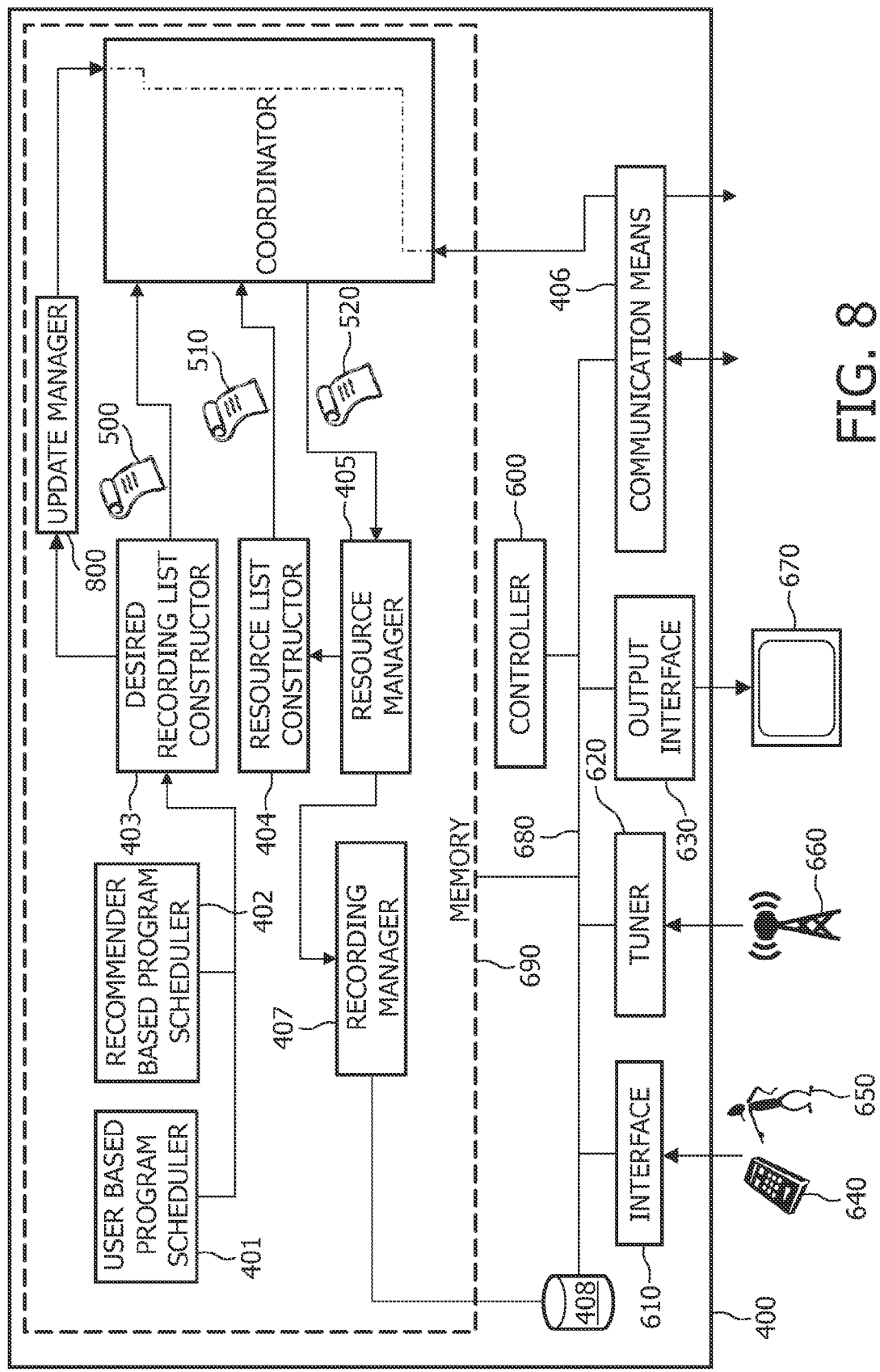
FIG. 8 illustrates a third device for sharing resources according to an exemplary embodiment of the invention.
Figure 14:
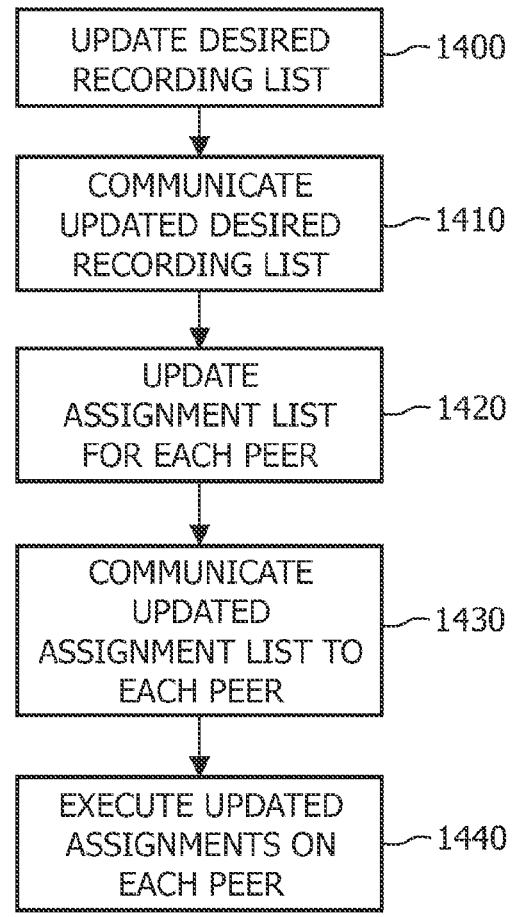
FIG. 14 illustrates a method for updating the desired recording list and assigning and executing a corresponding updated assignment list.

FIG. 8 illustrates a further exemplary embodiment of the present invention. The first peer 400 further comprises an update manager 800. In the embodiment, the update manager 800 may be communicatively coupled to the desired recording list constructor 403 and receive updates to the local desired recording list 500. Such updates can be initiated by the user 650 using remote control 640 and user interface 610. The update manager 800 is also communicatively coupled to the coordination unit 440 and therefore also to the other peers comprised with network of peers. A suitable method for updating desired recording lists is shown in FIG. 14. In step 1400, the user 650 may identify a new program to be recorded on a local peer, for example on the first peer 400, using remote control 640 and user interface 610. The update may also be the removal of a recording, or a change in the priority of a recording. Further updates may also be the result of changes initiated by the recommender based program scheduler 402. In step 1410 the coordinator unit 440 may receive an updated desired recording list. In such a case, the coordinator unit 440 may perform a further coordination of one or more updated desired recording lists with the available resources lists to compile one or more updated assignment lists for one or more peers, as shown in step 1420. In step 1430 any updated assignment lists are communicated to the corresponding peers, for execution in step 1440. The corresponding peers should, of course, execute assignments comprised within the updated assignment lists rather than execute assignments comprised within the original assignment lists.

Figure 11:
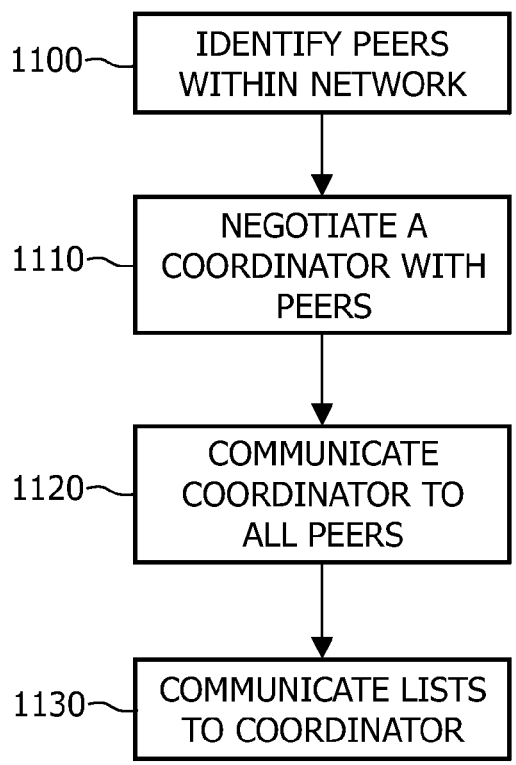
FIG. 11 illustrates a method for negotiating the role of coordinator within a network of peers.

In FIG. 11 a method is illustrated that may be used to identify and/or negotiate a coordinator unit 440 within the network of peers during an initialization phase or when the coordinator unit 440 is found to be unresponsive. In step 1100 initially the peers within the network may be identified using multicast or broadcast messages or via communication with a peer manager residing within the network of peers. Such methods are known to the skilled person and commonly applied in known peer-to-peer networks. In step 1110 the peers discovered in step 1100 may then negotiate which peer will accept the responsibility of being a coordinator. Many election methods for electing or negotiating a coordinator are known, such as the Bully algorithm or the Ring algorithm. For example, a Bully algorithm, as devised by Garcia-Molina in 1982 may be applied. In the Bully algorithm a process monitors an existing coordinator, if any, and when the process notices that the coordinator is no longer responding to requests, it initiates an election. For example, process P holds an election as follows:

1) P sends an election message to all processes with higher process priorities.

2) If no one responds, P wins the election and becomes coordinator.

3) If one of the higher priority processes answers, it takes over as the coordinator. P is then finished.

At any moment, a process can get an election message from a lower priority colleague. When such a message arrives, the receiver sends an acknowledgment message back to the sender to indicate that it is alive and will take over. The receiver then holds an election, unless it is already holding one. Eventually, all processes give up but one, and that one is the new coordinator. The coordinator announces its victory by sending all processes a message telling them that starting immediately it is the new coordinator.

In the following the lists employed in the exemplary embodiments of the invention will be discussed.

Figure 18:
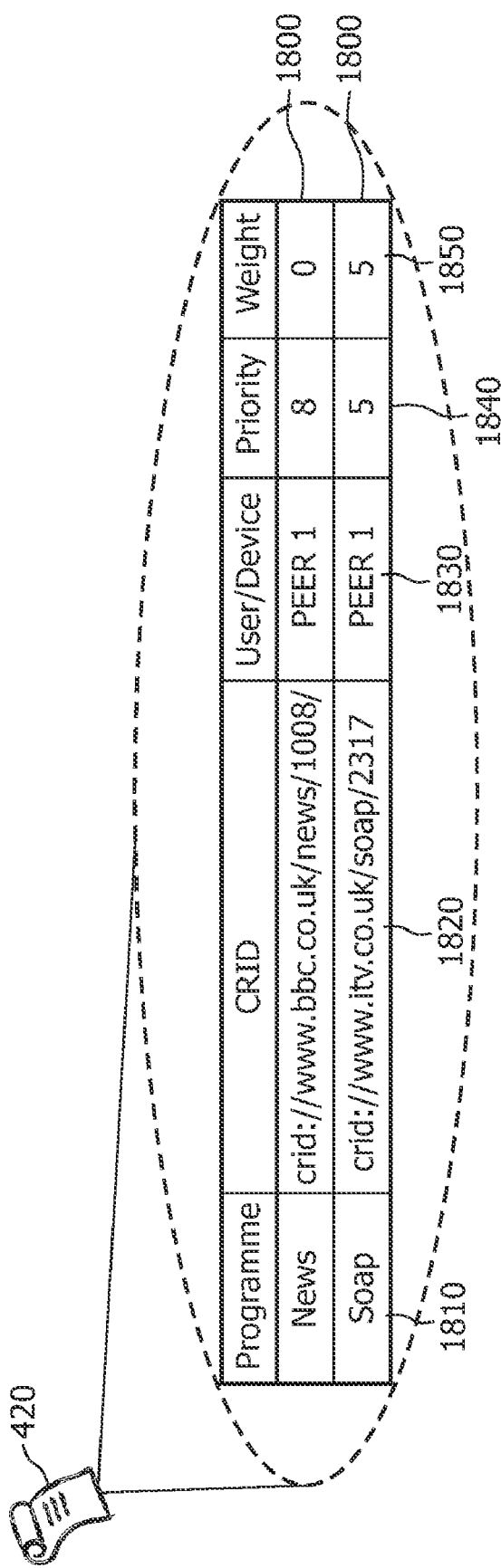
FIG. 18 illustrates an exemplary embodiment of a desired recording list.

FIG. 18 illustrates an example of a desired recording list. The desired recording list, for example, the first desired recording list 420 from FIG. 4, may comprise multiple recording entries, each recording entry 1800 may further comprise a user recognizable program identifier 1810, such as a plain text title or description of the program, a unique program identifier 1820 such that the peers comprised within the network of peers can differentiate programs and reliably exchange programs. A content reference identifier, or CRID, is known in the art to provide such functionality and was initially developed by the TV-Anytime forum. Other identifiers that may uniquely identify a program could, however, be used. The recording entry 1800 may also comprise a requester identifier 1830 to identify the peer requesting the program to be recorded. Such information is useful during the exchange of programs subsequent to the actual recording taking place. The requester identifier 1830 may be a (host) name or a Internet Protocol (IP) address to uniquely identify the peer or device. Also a priority indicator 1840 may be used to indicate the priority that a user gives to the recorded program. This may be useful input provided to the coordinator unit 440 for use during the coordination and compilation of the assignment lists. The inclusion of a weight indicator 1850 may be used to allow a user communicate preferences to the coordinator unit 440. For example, a high weight indicator may be used to indicate that a user would prefer that the program be recorded using local resources rather than using resources on a remote peer.

Figure 19:
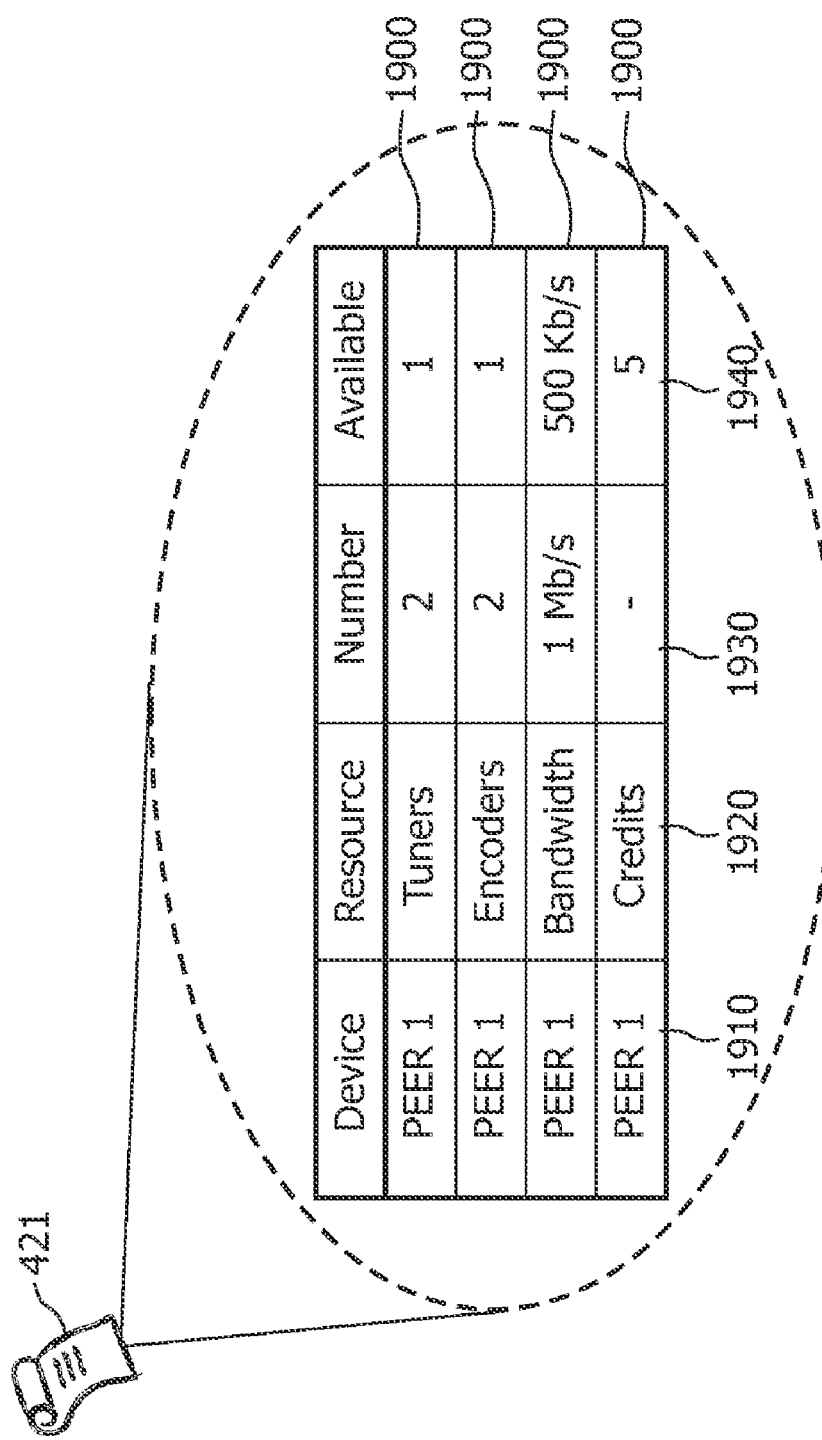
FIG. 19 illustrates an exemplary embodiment of an available resources list.

FIG. 19 illustrates an example of an available resources list. The available resources list, for example, the first available resources list 421 from FIG. 4, may comprise multiple resource entries, each resource entry 1900 may further comprise a device identifier 1910, such as a (host) name or a Internet Protocol (IP) address to uniquely identify the peer or device. A resource identifier 1920 may be used to identify the resources, such as the type of resource, for example, tuners, video encoder, bandwidth, storage space, credits etc. Specifically the use of credits may be used to allow individual users to bargain for/with resources. Such credits may also be system administered to ensure a fair sharing of resources. A resource quantity indicator 1930 may be used to indicate the quantity of resources available to a peer and a resource availability indicator 1940 may be used to indicate the quantity of resources that a peer is prepared to actually share. The information comprised within the desired recoding list 420 and the available resources list 421 allows a coordinator unit 440 to make fair optimizations of the available resources based upon the wishes expressed by the users of the network.

Figure 20:
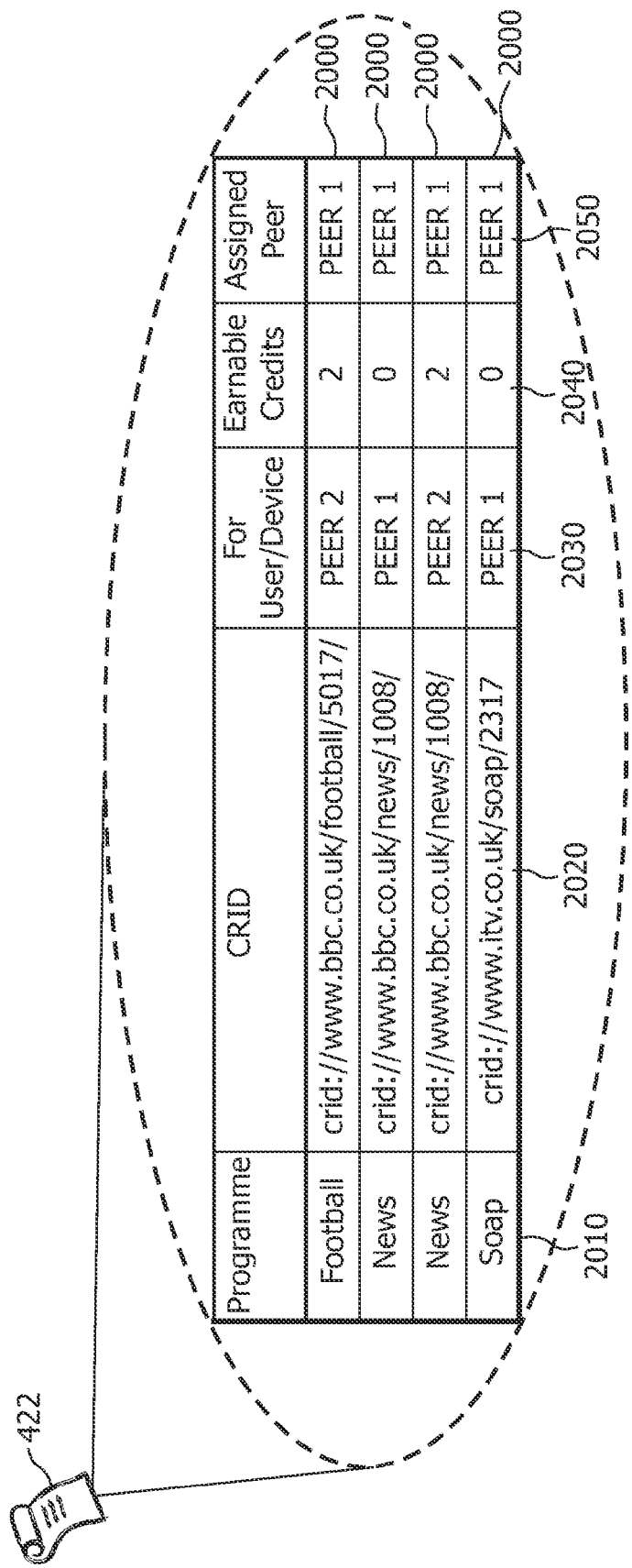
FIG. 20 illustrates an exemplary embodiment of an assignment list.

FIG. 20 illustrates an example of an assignment list. The assignment list, for example, the first assignment list 422 from FIG. 4, may comprise multiple assignment entries, each assignment entry 2000 may further comprise a user recognizable program identifier 2010, such as a plain text title or description of the program, a unique program identifier 2020 such that the peers comprised within the network of peers can differentiate programs and reliably exchange programs. A content reference identifier, or CRID, is known in the art to provide such functionality. Other unique content identifiers may also be used. The assignment entry 2000 may also comprise a requester identifier 2030 to identify the peer requesting the program to be recorded. The assignment entry 2000 may also comprise an assigned identifier 2050 to identify the peer assigned to record the program to be recorded. Such information, i.e. the requester identifier 2030 and assigned identifier 2050, is useful during the exchange of programs subsequent to the actual recording taking place. The requester identifier 2030 and/or the assigned identifier 2050 may be a (host) name or a Internet Protocol (IP) address to uniquely identify the peer or device. The assignment entry 2000 may also comprise value indicator 2040, indicating, for example, earnable credits. Specifically the use of credits may be used to allow individual users to bargain for/with resources. For example, a user could decide to allow the recording of a program on his/her peer only in return for a high credit value. Such credits may also be system administered, rather than user administered, to ensure a fair sharing of resources.

In the following, numerous methods for fairly coordinating and optimizing the assignments within the network of peers will be discussed. The invention is, however, not limited to the use of one or more of these methods.

FIG. 15 shows a method to coordinate assignments within the network of peers and the method may be incorporated at step 250 in the method of FIG. 2. The method shown in FIG. 15 begins at step 1500 by determining a plurality of satisfaction values. Each peer comprised within the network of peers may have an associated satisfaction value. The satisfaction value may be an indication of a level of satisfaction of the peer with a particular assignment list. By making use of the plurality of satisfaction values, a coordinating unit 440 is able to optimize a final assignment list based upon the plurality of satisfaction values in step 1510. The satisfaction for a particular peer may, for example, be the sum of the priorities of each program assigned to be recorded, or a ratio of the sum of priorities of each program to be recorded divided by the sum of priorities of all desired programs comprised within the corresponding desired recording list of that peer.

In FIG. 16*a* a method for optimizing the assignment list based upon the plurality of satisfaction values is shown. The method of FIG. 16*a* may be incorporated at step 1510 in the method of FIG. 15. At step 1600 a sum of the plurality of satisfaction values is determined over the complete network of peers and at step 1610 the assignment list is chosen for which the sum is maximized.

In FIG. 16*b* a further method for optimizing the assignment list based upon the plurality of satisfaction values is shown. The method of FIG. 16*b* may also be incorporated at step 1510 in the method of FIG. 15. At step 1620 a weight indicator 1850, such as that made available from the first desired recording list 420, may be determined. At step 1630 the weight indicator 1850 is used to determine a weighted sum of the satisfaction values. This is useful since users may have different appreciations for different programs, and may have a preference for recording certain programs on their own PVR. In this case, by attaching weights to desired programs the total of all users' appreciation for the desired program plus the additional appreciation of the respective user for recording this program on his/her own PVR the assignments can be influenced, or personalized, to some degree. In step 1640 the weighted sum of the plurality of satisfaction values is used to determine the optimal assignment list for which the weighted sum is maximized.

In FIG. 16*c* a third method for optimizing the assignment list based upon the plurality of satisfaction values is shown. The method of FIG. 16*c* may also be incorporated at step 1510 in the method of FIG. 15. At step 1650 the minimum amongst the plurality of satisfaction values is determined over the complete network of peers and at step 1660 the assignment list is chosen for which the minimum is maximized. Setting the criteria to focus upon the minimum amongst the plurality of satisfaction values ensures that each and every peer receives a reasonable quality of service. For example, a peer with a single low priority desired recording residing in a network of peers with multiple high priority recordings per peer will still find it's recording honored.

Figure 17:
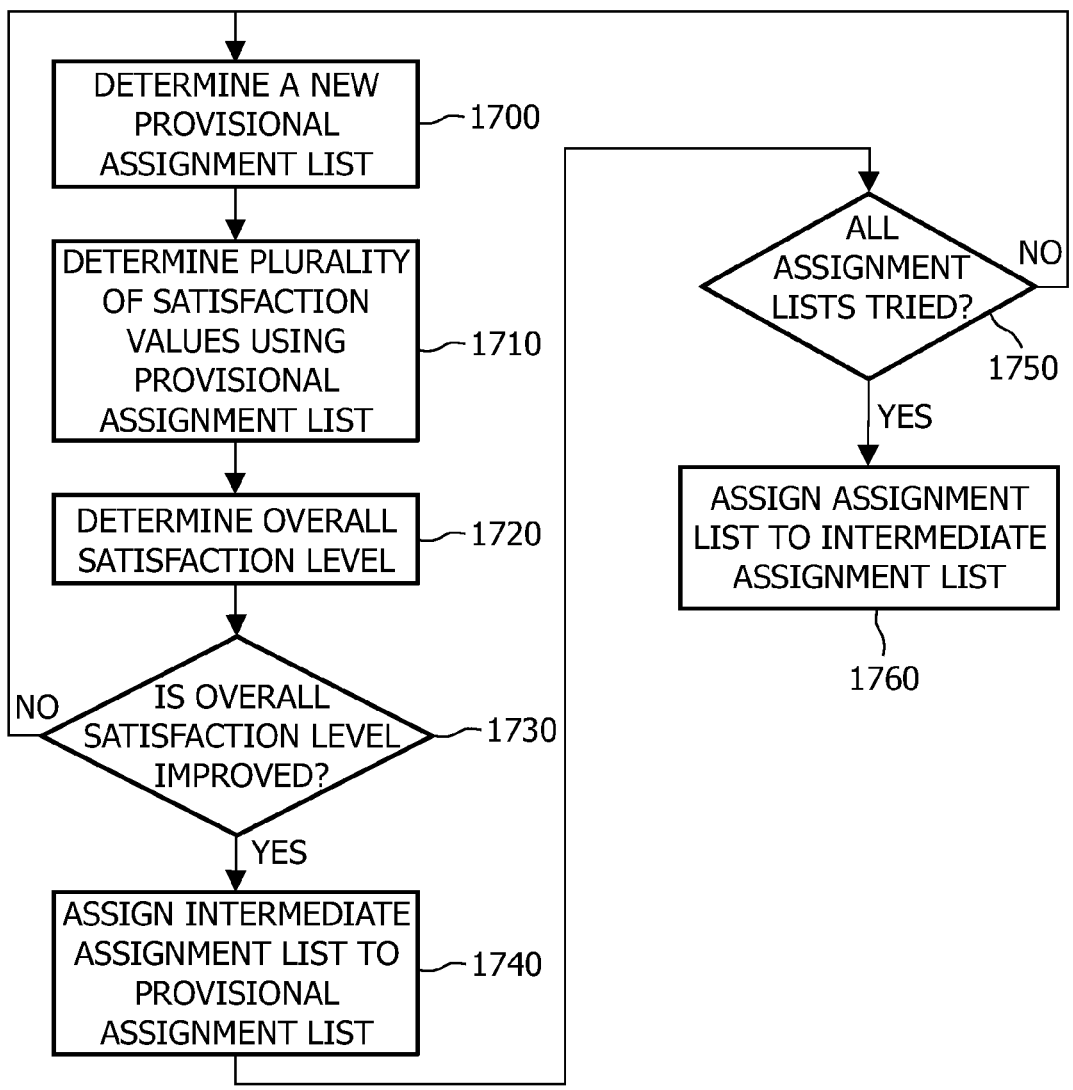
FIG. 17 illustrates an iterative method for coordinating, compiling and optimizing the assignment list based upon the determination of a plurality of satisfactions values.

FIG. 17 shows a further method to coordinate assignments within the network of peers. The method may be incorporated at step 250 in the method of FIG. 2. The method shown in FIG. 17 is an iterative method and begins at step 1700 by determining a new provisional assignment list. At step 1710 a plurality of satisfaction values is determined. Again, each peer comprised within the network of peers may have an associated satisfaction value. The satisfaction value is an indication of a level of satisfaction of each peer with a particular assignment list. In step 1720 an overall satisfaction value is determined, for example, by the coordinating unit 440. At step 1730 a decision point is reached. If the overall satisfaction value has not been improved by the new provisional assignment list then the method returns to step 1700 where a further new provisional assignment list is determined. However, if the overall satisfaction value has been improved by the new provisional assignment list then this is stored as an intermediate assignment list. During initialization the intermediate assignment list may initially be cleared or set to be equal to the first new provisional assignment list determined. At step 1750 a decision point is reached where a test is performed to see if all possible provisional assignment lists have been tested. Of course, other end tests are also possible, such as, the amount of improvement in the solution over previous iterations, for example. If all provisional assignment lists have not been tested the method returns to step 1700. If, however, all provisional assignment lists have been tested the assignment list is set, at step 1760, to be equal to the intermediate assignment list and the algorithm ends. Such an iterative method is useful for cases where the satisfaction value or the overall satisfaction value are non-linear functions or when a large number of variables are involved in determining the optimal at least one assignment list.

Figure 21:
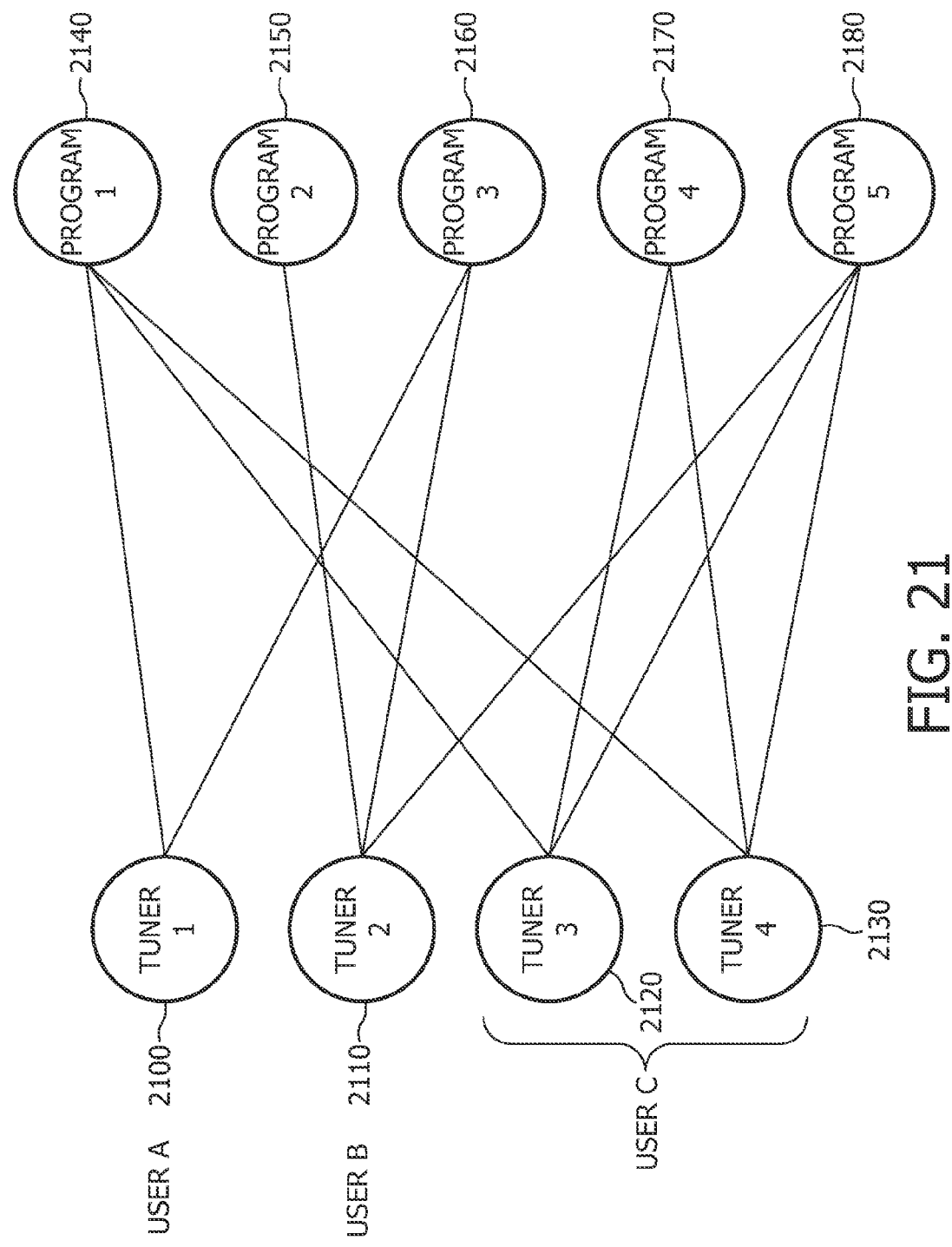
FIG. 21 illustrates an exemplary bipartite graph showing three users, owning four tuners, the three users wishing to record five programs.

FIG. 21 illustrates an example of a bipartite graph. A bipartite graphing method may be used as a further method to coordinate assignments within the network of peers. For example, the method may also be incorporated at step 250 in the method of FIG. 2. Specifically, a bipartite graph, which is also called a bigraph, is a set of graph vertices decomposed into two disjoint sets or subsets such that no two graph vertices within the same set or subset are adjacent. In FIG. 21 a bipartite graph is shown with four tuners, first tuner 2100, second tuner 2110, third tuner 2120 and fourth tuner 2130 on one side, i.e. the resources available. On the other side of the graph are five programs to be recorded, first program 2140, second program 2150, third program 2160, fourth program 2170 and fifth program 2180. An edge may be drawn between a tuner node and a program node in the graph if and only if that tuner can receive that program. A further limitation may also be placed upon the graph edges by drawing edges only if and only if that tuner can receive that program and the user that owns that tuner wants to watch it. In either case the total number of recorded programs may be maximized by determining a maximal cardinality matching in the constructed graph, which can be done efficiently, see A. Gibbons, Algorithmic Graph Theory, Cambridge University Press, Cambridge, 1985. In a matching, one may choose a subset of the edges, indicating which tuner should record what program, such that no two chosen edges have an end point in common. This prevents a tuner from having to record more than one program. Additionally, it prevents a program from being recorded by more than one tuner. In this way n tuners can record up to n programs simultaneously.

In summary the invention discloses methods and devices for sharing resources in a network of peers. A user may compile a wish list of programs to be recorded on a recording device that is a peer in the network. A resource list is compiled of resources that the device shares within the network. The wish list and resource list are communicated to a coordinator comprised within the network. The coordinator makes assignments of who records what and communicates an assignment list to each peer. Each peer plans and executes the assigned recordings, which can be retrieved from a peer, or sent to the user device. Deletion control is applied to prevent the loss of recordings by deletion on a local peer. The coordinator may be comprised within a peer, as a standalone service within the network or implemented as a distributed algorithm between the peers.

It should be noted that the above-mentioned embodiments illustrate rather than limit the invention, and that those skilled in the art will be capable of designing many alternative embodiments without departing from the scope of the invention as defined by the appended claims. Furthermore, any of the embodiments described comprise implicit features, such as, an internal current supply, for example, a battery or an accumulator. In the claims, any reference signs placed in parentheses shall not be construed as limiting the claims. The word "comprising" and "comprises", and the like, does not exclude the presence of elements or steps other than those listed in any claim or the specification as a whole. The singular reference of an element does not exclude the plural reference of such elements and vice-versa. In a device claim enumerating several means, several of these means may be embodied by one and the same item of hardware. The mere fact that certain measures are recited in mutually different dependent claims does not indicate that a combination of these measures cannot be used to advantage.

The invention claimed is:

1. A method for sharing resources in a network of peers, the method comprising:
    receiving, at a coordinator of a coordinating peer, (i) a plurality of desired recording lists and (ii) a plurality of available resources lists (iii) from peers within the network of peers, wherein the plurality of desired recording lists each include (i)(a) at least one recording entry of identifiers and indicators (i)(b) for coordinating and compiling assignment lists, and wherein the plurality of available resources lists each include (ii)(a) at least one resource entry of identifiers and indicators (ii)(b) for identifying peers that have resources available that are also capable of recording programs for fellow peers;
    coordinating, via the coordinator, (i) the plurality of desired recording lists and (ii) the plurality of available resources lists and (iii) compiling, via the coordinator, at least one assignment list for at least one peer within the network of peers; and
    communicating, via the coordinator, the at least one assignment list to the at least one peer within the network of peers, wherein each assignment list comprises (i) one or more assignment entry of identifiers and indicators (ii) for informing a corresponding peer (ii)(a) what actions are required to be taken by the corresponding peer and (ii)(b) for which fellow peer the corresponding peer is performing the actions,
    wherein (I) the at least one recording entry of identifiers and indicators comprises (i) a user recognizable program identifier, (ii) a unique program identifier such that the peers within the network of peers can differentiate programs and reliably exchange programs, (iii) a requestor identifier to identify the peer requesting the program to be recorded, the requestor identifier for use during exchange of programs subsequent to an actual recording taking place, (iv) a priority indicator to indicate a priority that a user gives to the recorded program, the priority indicator for being provided as input to the coordinator unit for use during the coordination and compilation of the assignment lists, and (v) a weight indicator to allow a user to communicate preferences to the coordinator unit,
    wherein (II) the at least one resource entry of identifiers and indicators comprises (i) a device identifier to uniquely identify a peer or a device, (ii) a resource identifier to identify the resources, including a type of a resource, (iii) a resource quantity indicator to indicate the quantity of resources available to a peer, and (iv) a resource availability indicator to indicate the quantity of resources that a peer is prepared to actually share, and
    wherein (III) the one or more assignment entry of identifiers and indicators comprises (i) a user recognizable program identifier, (ii) a unique program identifier such that the peers within the network of peers can differentiate programs and reliably exchange programs, (iii) a requestor identifier to identify the peer requesting the program to be recorded, (iv) an assigned identifier to identify the peer assigned to record the program to be recorded, and (v) a value indicator to indicate earnable credits that allow individual users to bargain for resources.

2. The method of claim 1 wherein coordinating further comprises:
    determining a plurality of satisfaction values comprising a satisfaction value for each peer within the network of peers, the satisfaction value being an indication of a level of satisfaction of each peer with a particular at least one assignment list; and
    optimizing at least one final assignment list based upon the plurality of satisfaction values determined.

3. The method of claim 2 wherein optimizing further comprises:
    determining a sum of the plurality of satisfaction values; and
    optimizing the at least one final assignment list based upon the sum.

4. The method of claim 3 wherein determining the sum further comprises:
    determining a weight indicator for each peer within the network of peers;
    determining the sum as a weighted sum based upon the weight indicator for each peer; and
    optimizing the at least one final assignment list based upon the weighted sum.

5. The method of claim 2 wherein optimizing further comprises:
    determining a minimum amongst the plurality of satisfaction values; and
    optimizing the at least one final assignment list based upon the minimum determined.

6. The method of claim 2 wherein optimizing further comprises:
    optimizing the at least one final assignment list using a bipartite graph matching algorithm.

7. The method of claim 1 wherein coordinating further comprises:
    determining at least one provisional assignment list;

determining a plurality of satisfaction values that comprises a satisfaction value for each peer within the network of peers, the satisfaction value for each peer being an indication of a level of satisfaction of each peer with a particular at least one provisional assignment list;

determining an overall satisfaction value from the plurality of satisfaction values; and assigning the at least one assignment list to be equal to the at least one provisional assignment list when the overall satisfaction value is maximized.

8. The method of claim 1, further comprising:

receiving at least one updated desired recording list; and wherein coordinating further comprises coordinating the at least one updated desired recording list, the plurality of desired recording lists and the plurality of available resources lists and compiling an updated assignment list for each peer within the network of peers; and wherein communicating further comprises communicating the updated assignment list for each peer to each peer within the network of peers.

9. A method for sharing resources in a network of peers, comprising:

generating (i) a desired recording list and (ii) an available resources list on at least one peer within the network of peers;

transmitting (i) the desired recording list and (ii) the available resources list to (iii) a coordinating peer within the network of peers, wherein the desired recording list includes (i)(a) at least one recording entry of identifiers and indicators (i)(b) for coordinating and compiling at least one assignment list, and wherein the available resources lists includes (ii)(a) at least one resource entry of identifiers and indicators (ii)(b) for identifying peers that have resources available that are also capable of recording programs for fellow peers;

receiving at least one assignment list on the at least one peer from the coordinating peer; and executing on the at least one peer at least one assignment within the at least one assignment list using resources available to the at least one peer, wherein each assignment list comprises (i) one or more assignment entry of identifiers and indicators (ii) for informing a corresponding peer (ii)(a) what actions are required to be taken by the at least one peer and (ii)(b) for which fellow peer the at least one peer is performing the actions, wherein (I) the at least one recording entry of identifiers and indicators comprises (i) a user recognizable program identifier, (ii) a unique program identifier such that the peers within the network of peers can differentiate programs and reliably exchange programs, (iii) a requestor identifier to identify the peer requesting the program to be recorded, the requestor identifier for use during exchange of programs subsequent to an actual recording taking place, (iv) a priority indicator to indicate a priority that a user gives to the recorded program, the priority indicator for being provided as input to the coordinator unit for use during the coordination and compilation of the assignment lists, and (v) a weight indicator to allow a user to communicate preferences to the coordinator unit, wherein (II) the at least one resource entry of identifiers and indicators comprises (i) a device identifier to uniquely identify a peer or a device, (ii) a resource identifier to identify the resources, including a type of a resource, (iii) a resource quantity indicator to indicate the quantity of resources available to a peer, and (iv) a resource availability indicator to indicate the quantity of resources that a peer is prepared to actually share, and wherein (III) the one or more assignment entry of identifiers and indicators comprises (i) a user recognizable program identifier, (ii) a unique program identifier such that the peers within the network of peers can differentiate programs and reliably exchange programs, (iii) a requestor identifier to identify the peer requesting the program to be recorded, (iv) an assigned identifier to identify the peer assigned to record the program to be recorded, and (v) a value indicator to indicate earnable credits that allow individual users to bargain for resources.

10. The method of claim 9, wherein generating further comprises:

receiving input from a user interface or recommender unit, the input indicating programs desired to be recorded; and compiling a desired recording list from the input.

11. The method of claim 9, further comprising:

negotiating within the network of peers to determine the coordinating peer, wherein negotiating is performed prior to transmitting.

12. The method of claim 9, further comprising:

identifying a recording to be retrieved;

identifying an assigned peer, the assigned peer being a peer assigned to record the recording to be retrieved; and retrieving the recording from the assigned peer.

13. The method of claim 9, further comprising:

identifying a recording to be distributed;

identifying at least one target peer, the at least one target peer being a peer that requested recording of the recording to be distributed; and distributing the recording to be distributed to the at least one target peer.

14. The method of claim 9, further comprising:

identifying a recording to be deleted on a local peer;

identifying at least one target peer, the at least one target peer being a peer that requested recording of the recording to be deleted;

distributing the recording to be deleted from the local peer to the at least one target peer; and deleting the recording to be deleted on the local peer.

15. The method of claim 9, further comprising:

receiving update input from a user or a recommender, the update input indicating an update to the desired recording list; and wherein transmitting further comprises transmitting the update to the desired recording list to the coordinating peer within the network of peers;

receiving at least one assignment list further comprises receiving an updated assignment list from the coordinating peer; and executing further comprises executing at least one updated assignment within the updated assignment list, in place of the at least one assignment within the at least one assignment list, using resources available to the at least one peer.

16. A system for sharing resources in a network of peers, comprising:

a coordinator; and a plurality of peers, wherein each peer within the plurality of peers comprises:

a recording list compiler for generating a desired recording list;

a resource manager for generating an available resources list;

a network interface for transmitting (i) the desired recording list and (ii) the available resources list to the coordinator, wherein the desired recording list includes (i)(a) at least one recording entry of identifiers and indicators (i)(b) for coordinating and compiling assignment lists, and wherein the available resources list includes (ii)(a) at least one resource entry of identifiers and indicators (ii)(b) for identifying peers that have resources available that are also capable of recording programs for fellow peers;

an interface for receiving an assignment list for each peer from the coordinator;

a controller for executing at least one assignment within the assignment list; and wherein the coordinator further receives (i) the desired recording list and (ii) the available resources list from each peer within the plurality of peers;

compiles the assignment list for each peer based upon (i) the desired recording list and (ii) the available resources list received from each peer within the plurality of peers; and transmits the assignment list for each peer to the plurality of peers via the network interface, wherein each assignment list comprises (i) one or more assignment entry of identifiers and indicators (ii) for informing a corresponding peer (ii)(a) what actions are required to be taken by the corresponding peer and (ii)(b) for which fellow peer the corresponding peer is performing the actions, wherein (I) the at least one recording entry of identifiers and indicators comprises (i) a user recognizable program identifier, (ii) a unique program identifier such that the peers within the network of peers can differentiate programs and reliably exchange programs, (iii) a requestor identifier to identify the peer requesting the program to be recorded, the requestor identifier for use during exchange of programs subsequent to an actual recording taking place, (iv) a priority indicator to indicate a priority that a user gives to the recorded program, the priority indicator for being provided as input to the coordinator unit for use during the coordination and compilation of the assignment lists, and (v) a weight indicator to allow a user to communicate preferences to the coordinator unit, wherein (II) the at least one resource entry of identifiers and indicators comprises (i) a device identifier to uniquely identify a peer or a device, (ii) a resource identifier to identify the resources, including a type of a resource, (iii) a resource quantity indicator to indicate the quantity of resources available to a peer, and (iv) a resource availability indicator to indicate the quantity of resources that a peer is prepared to actually share, and wherein (III) the one or more assignment entry of identifiers and indicators comprises (i) a user recognizable program identifier, (ii) a unique program identifier such that the peers within the network of peers can differentiate programs and reliably exchange programs, (iii) a requestor identifier to identify the peer requesting the program to be recorded, (iv) an assigned identifier to identify the peer assigned to record the program to be recorded, and (v) a value indicator to indicate earnable credits that allow individual users to bargain for resources.

17. The system of claim 16, wherein the coordinator further:

determines a plurality of satisfaction values that include a satisfaction value for each peer, the satisfaction value for each peer being an indication of a level of satisfaction of each peer with the respective assignment list for each peer; and optimizes the respective assignment list for each peer based upon the plurality of determined satisfaction values.

18. A device for sharing resources in a system that includes a plurality of peers and a coordinator, the device comprising:

a desired recording list constructor for generating a desired recording list;

a resource list constructor for generating an available resources list;

a network interface for transmitting (i) the desired recording list and (ii) the available resources list to the coordinator, wherein the desired recording list includes (i)(a) at least one recording entry of identifiers and indicators (i)(b) for coordinating and compiling assignment lists, and wherein the resources list includes (ii)(a) at least one resource entry of identifiers and indicators (ii)(b) for identifying peers that have resources available that are also capable of recording programs for fellow peers;

a network interface for receiving an assignment list from the coordinator; and a controller for executing at least one assignment within the assignment list using resources on the device, wherein each assignment list comprises (i) one or more assignment entry of identifiers and indicators (ii) for informing a corresponding peer (ii)(a) what actions are required to be taken by the corresponding peer and (ii)(b) for which fellow peer the peer is performing the actions, wherein (I) the at least one recording entry of identifiers and indicators comprises (i) a user recognizable program identifier, (ii) a unique program identifier such that the peers within the network of peers can differentiate programs and reliably exchange programs, (iii) a requestor identifier to identify the peer requesting the program to be recorded, the requestor identifier for use during exchange of programs subsequent to an actual recording taking place, (iv) a priority indicator to indicate a priority that a user gives to the recorded program, the priority indicator for being provided as input to the coordinator unit for use during the coordination and compilation of the assignment lists, and (v) a weight indicator to allow a user to communicate preferences to the coordinator unit, wherein (II) the at least one resource entry of identifiers and indicators comprises (i) a device identifier to uniquely identify a peer or a device, (ii) a resource identifier to identify the resources, including a type of a resource, (iii) a resource quantity indicator to indicate the quantity of resources available to a peer, and (iv) a resource availability indicator to indicate the quantity of resources that a peer is prepared to actually share, and wherein (III) the one or more assignment entry of identifiers and indicators comprises (i) a user recognizable program identifier, (ii) a unique program identifier such that the peers within the network of peers can differentiate programs and reliably exchange programs, (iii) a requestor identifier to identify the peer requesting the program to be recorded, (iv) an assigned identifier to identify the peer assigned to record the program to be recorded, and (v) a value indicator to indicate earnable credits that allow individual users to bargain for resources.

19. A device for sharing resources in a system comprising a plurality of peers, the device comprising:
- a network interface for receiving (i) a plurality of desired recording lists and (ii) a plurality of available resources lists (iii) from the plurality of peers, wherein the plurality of desired recording lists each include (i)(a) at least one recording entry of identifiers and indicators (i)(b) for coordinating and compiling assignment lists, and wherein the plurality of available resources lists each include (ii)(a) at least one resource entry of identifiers and indicators (ii)(b) for identifying peers that have resources available that are also capable of recording programs for fellow peers;
- a coordinator for coordinating (i) the plurality of desired recording lists and (ii) the plurality of available resources lists and (iii) for compiling at least one assignment list based upon (iii)(a) the plurality of desired recording lists and (iii)(b) the plurality of available resources lists (iii)(c) received from the plurality of peers; and
- a network interface for transmitting the at least one assignment list to the plurality of peers, wherein each assignment list comprises (i) one or more assignment entry of identifiers and indicators (ii) for informing a corresponding peer (ii)(a) what actions are required to be taken by the peer and (ii)(b) for which fellow peer the peer is performing the actions,
- wherein (I) the at least one recording entry of identifiers and indicators comprises (i) a user recognizable program identifier, (ii) a unique program identifier such that the peers within the network of peers can differentiate programs and reliably exchange programs, (iii) a requestor identifier to identify the peer requesting the program to be recorded, the requestor identifier for use during exchange of programs subsequent to an actual recording taking place, (iv) a priority indicator to indicate a priority that a user gives to the recorded program, the priority indicator for being provided as input to the coordinator unit for use during the coordination and compilation of the assignment lists, and (v) a weight indicator to allow a user to communicate preferences to the coordinator unit,
- wherein (II) the at least one resource entry of identifiers and indicators comprises (i) a device identifier to uniquely identify a peer or a device, (ii) a resource identifier to identify the resources, including a type of a resource, (iii) a resource quantity indicator to indicate the quantity of resources available to a peer, and (iv) a resource availability indicator to indicate the quantity of resources that a peer is prepared to actually share, and
- wherein (III) the one or more assignment entry of identifiers and indicators comprises (i) a user recognizable program identifier, (ii) a unique program identifier such that the peers within the network of peers can differentiate programs and reliably exchange programs, (iii) a requestor identifier to identify the peer requesting the program to be recorded, (iv) an assigned identifier to identify the peer assigned to record the program to be recorded, and (v) a value indicator to indicate earnable credits that allow individual users to bargain for resources.

20. The device of claim 19, wherein the coordinator further:
- determines a plurality of satisfaction values that include a satisfaction value for each peer within the plurality of peers, the satisfaction value for each peer being an indication of a level of satisfaction of each peer with the at least one assignment list; and
- optimizes the at least one assignment list based upon the plurality of determined satisfaction values.

21. The device of claim 19, further comprising:
- a desired recording list constructor for generating a local desired recording list;
- a resource list constructor for generating a local available resources list; and
- a controller for executing at least one local assignment within a local assignment list using resources on the device; and wherein
- the coordinator further compiles the local assignment list and the at least one assignment list based upon the plurality of desired recording lists, the local desired recording list, the plurality of available resources lists and the local available resources list.

22. A non-transitory computer-readable medium directly loadable into the memory of a programmable device, comprising software code portions for performing, when said code portions are run on the device, the method steps of:
- receiving (i) a plurality of desired recording lists and (ii) a plurality of available resources lists (iii) from peers within a network of peers, wherein the plurality of desired recording lists each include (i)(a) at least one recording entry of identifiers and indicators (i)(b) for coordinating and compiling assignment lists, and wherein the plurality of available resources lists each include (ii)(a) at least one resource entry of identifiers and indicators (ii)(b) for identifying peers that have resources available that are also capable of recording programs for fellow peers;
- coordinating (i) the plurality of desired recording lists and (ii) the plurality of available resources lists and (iii) compiling at least one assignment list for at least one peer within the network of peers; and
- communicating the at least one assignment list to the at least one peer within the network of peers, wherein each assignment list comprises (i) one or more assignment entry of identifiers and indicators (ii) for informing a corresponding peer (ii)(a) what actions are required to be taken by the corresponding peer and (ii)(b) for which fellow peer the corresponding peer is performing the actions,
- wherein (I) the at least one recording entry of identifiers and indicators comprises (i) a user recognizable program identifier, (ii) a unique program identifier such that the peers within the network of peers can differentiate programs and reliably exchange programs, (iii) a requestor identifier to identify the peer requesting the program to be recorded, the requestor identifier for use during exchange of programs subsequent to an actual recording taking place, (iv) a priority indicator to indicate a priority that a user gives to the recorded program, the priority indicator for being provided as input to the coordinator unit for use during the coordination and compilation of the assignment lists, and (v) a weight indicator to allow a user to communicate preferences to the coordinator unit,
- wherein (II) the at least one resource entry of identifiers and indicators comprises (i) a device identifier to uniquely identify a peer or a device, (ii) a resource identifier to identify the resources, including a type of a resource, (iii) a resource quantity indicator to indicate the quantity of resources available to a peer, and (iv) a resource availability indicator to indicate the quantity of resources that a peer is prepared to actually share, and wherein (III) the one or more assignment entry of identifiers and indicators comprises (i) a user recognizable program identifier, (ii) a unique program identifier such that the peers within the network of peers can differentiate programs and reliably exchange programs, (iii) a requestor identifier to identify the peer requesting the program to be recorded, (iv) an assigned identifier to identify the peer assigned to record the program to be recorded, and (v) a value indicator to indicate earnable credits that allow individual users to bargain for resources.

23. A non-transitory computer-readable medium directly loadable into the memory of a programmable device, comprising software code portions for performing, when said code portions are run on the device, the method steps of:

generating (i) a desired recording list and (ii) an available resources list (iii) on at least one peer within a network of peers, wherein the desired recording list includes (ii)(a) at least one recording entry of identifiers and indicators (i)(b) for coordinating and compiling assignment lists, and wherein the available resources list includes (ii)(a) at least one resource entry of identifiers and indicators (ii)(b) for identifying peers that have resources available that are also capable of recording programs for fellow peers;

transmitting (i) the desired recording list and (ii) the available resources list (iii) to a coordinating peer within the network of peers;

receiving at least one assignment list on the at least one peer from the coordinating peer, wherein each assignment list comprises (i) one or more assignment entry of identifiers and indicators (ii) for informing a corresponding peer (ii)(a) what actions are required to be taken by the corresponding peer and (ii)(b) for which fellow peer the peer is performing the actions; and executing on the at least one peer at least one assignment within the at least one assignment list using resources available to the at least one peer, wherein (I) the at least one recording entry of identifiers and indicators comprises (i) a user recognizable program identifier, (ii) a unique program identifier such that the peers within the network of peers can differentiate programs and reliably exchange programs, (iii) a requestor identifier to identify the peer requesting the program to be recorded, the requestor identifier for use during exchange of programs subsequent to an actual recording taking place, (iv) a priority indicator to indicate a priority that a user gives to the recorded program, the priority indicator for being provided as input to the coordinator unit for use during the coordination and compilation of the assignment lists, and (v) a weight indicator to allow a user to communicate preferences to the coordinator unit, wherein (II) the at least one resource entry of identifiers and indicators comprises (i) a device identifier to uniquely identify a peer or a device, (ii) a resource identifier to identify the resources, including a type of a resource, (iii) a resource quantity indicator to indicate the quantity of resources available to a peer, and (iv) a resource availability indicator to indicate the quantity of resources that a peer is prepared to actually share, and wherein (III) the one or more assignment entry of identifiers and indicators comprises (i) a user recognizable program identifier, (ii) a unique program identifier such that the peers within the network of peers can differentiate programs and reliably exchange programs, (iii) a requestor identifier to identify the peer requesting the program to be recorded, (iv) an assigned identifier to identify the peer assigned to record the program to be recorded, and (v) a value indicator to indicate earnable credits that allow individual users to bargain for resources.

* * * * *